US012210438B1

(12) United States Patent
Jacob et al.

(10) Patent No.: US 12,210,438 B1
(45) Date of Patent: *Jan. 28, 2025

(54) BREAKPOINTS IN NEURAL NETWORK ACCELERATOR

(71) Applicant: Amazon Technologies, Inc., Seattle, WA (US)

(72) Inventors: Samuel Jacob, Fremont, CA (US); Drazen Borkovic, Los Altos, CA (US); Yu Zhou, Pflugerville, TX (US); Mohammad El-Shabani, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/947,949

(22) Filed: Sep. 19, 2022

Related U.S. Application Data

(63) Continuation of application No. 16/368,351, filed on Mar. 28, 2019, now Pat. No. 11,467,946.

(51) Int. Cl.
*G06F 11/36* (2006.01)
*G06F 8/41* (2018.01)
*G06N 3/10* (2006.01)

(52) U.S. Cl.
CPC ............ *G06F 11/3636* (2013.01); *G06F 8/41* (2013.01); *G06F 11/3664* (2013.01); *G06N 3/10* (2013.01)

(58) Field of Classification Search
CPC .... G06F 11/3636; G06F 11/3664; G06F 8/41; G06N 3/10
See application file for complete search history.

(56) References Cited

U.S. PATENT DOCUMENTS

| 5,630,049 A | 5/1997 | Cardoza et al. |
| 6,934,937 B1 | 8/2005 | Johnson et al. |
| 7,865,883 B1 | 1/2011 | Sistare et al. |

(Continued)

OTHER PUBLICATIONS

Cai, et al., "TensorFlow DeBugger: Debugging Dataflow Graphs for Machine Learning", Google Inc., 30th Conference on Neural Information Processing Systems, 2016, 5 pages.

(Continued)

*Primary Examiner* — Wei Y Zhen
*Assistant Examiner* — Brahim Bourzik
(74) *Attorney, Agent, or Firm* — Kilpatrick Townsend & Stockton LLP

(57) ABSTRACT

Techniques are disclosed for setting a breakpoint for debugging a neural network. User input is received by a debugger program executable by a host processor indicating a target layer of a neural network at which to halt execution of the neural network. The neural network includes a first set of instructions to be executed by a first execution engine and a second set of instructions to be executed by a second execution engine. A first halt point is set within the first set of instructions and a second halt point is set within the second set of instructions. It is then determined that operation of the first execution engine and the second execution engine has halted. It is then determined that the first execution engine has reached the first halt point. The second execution engine is then caused to move through instructions until reaching the second halt point.

20 Claims, 11 Drawing Sheets

(56) References Cited

U.S. PATENT DOCUMENTS

| | | | |
|---|---|---|---|
| 10,318,403 B2* | 6/2019 | Gao | G06F 11/362 |
| 2006/0075298 A1 | 4/2006 | Drori et al. | |
| 2006/0282707 A1* | 12/2006 | Rosenbluth | G06F 11/3648 |
| | | | 714/38.14 |
| 2008/0294853 A1* | 11/2008 | Kowlali | G06F 11/3644 |
| | | | 711/154 |
| 2010/0332909 A1 | 12/2010 | Larson | |
| 2013/0055217 A1* | 2/2013 | Boxall | G06F 11/3624 |
| | | | 717/129 |
| 2015/0033211 A1* | 1/2015 | Bates | G06F 11/3636 |
| | | | 717/129 |
| 2015/0206049 A1 | 7/2015 | Canoy et al. | |
| 2017/0289240 A1* | 10/2017 | Ghare | H04L 67/10 |
| 2019/0102567 A1* | 4/2019 | Lemay | G06F 8/41 |
| 2020/0301819 A1* | 9/2020 | Kavilipati | G06N 3/045 |
| 2022/0012164 A1 | 1/2022 | Grymel et al. | |
| 2023/0109752 A1* | 4/2023 | Levit-Gurevich | |
| | | | G06F 11/3466 |
| | | | 717/128 |

OTHER PUBLICATIONS

Huang, et al.; Design and Implementation of Convolutional Neural Network Accelerator with Variable Layer-by-layer Debugging; 6 pages (Year: 2018).

U.S. Appl. No. 16/368,351 "Breakpoints in Neural Network Accelerator" filed Mar. 28, 2019.

U.S. Appl. No. 16/368,351 "Non-Final Office Action", mailed Dec. 11, 2020, 16 pages.

U.S. Appl. No. 16/368,351 "Final Office Action", mailed Jul. 14, 2021, 17 pages.

U.S. Appl. No. 16/368,351 "Advisory Action", mailed Oct. 1, 2021, 5 pages.

U.S. Appl. No. 16/368,351 "Non-Final Office Action", mailed Feb. 4, 2022, 33 pages.

U.S. Appl. No. 16/368,351 "Notice of Allowance", mailed Jun. 8, 2022, 9 pages.

* cited by examiner

BREAKPOINTS IN NEURAL NETWORK ACCELERATOR

CROSS-REFERENCE TO RELATED APPLICATION

This application claims priority to and is a continuation of U.S. patent application Ser. No. 16/368,351, filed Mar. 28, 2019, issued as U.S. Pat. No. 11,467,946 on Oct. 11, 2022 and entitled "BREAKPOINTS IN NEURAL NETWORK ACCELERATOR," the content of which is hereby incorporated by reference in its entirety for all purposes.

BACKGROUND

Debugging is an important step for improving the functionality of computing devices at the hardware or software level. As both computing devices and the software operating on them have become more complex, the debugging techniques have also expanded with more methods to detect so-called errors, bugs, or defects. Some debugging techniques include setting a breakpoint at some location within the source code of an application so as to stop or pause the application in place while different variables and data structures associated with the application can be examined. While various debugging tools are available for setting breakpoints in simple systems, new techniques are needed for setting breakpoints in more complex systems such as those composed of multiple asynchronous execution engines.

BRIEF DESCRIPTION OF THE DRAWINGS

Various embodiments in accordance with the present disclosure will be described with reference to the drawings, in which.

DETAILED DESCRIPTION

Figure 1:
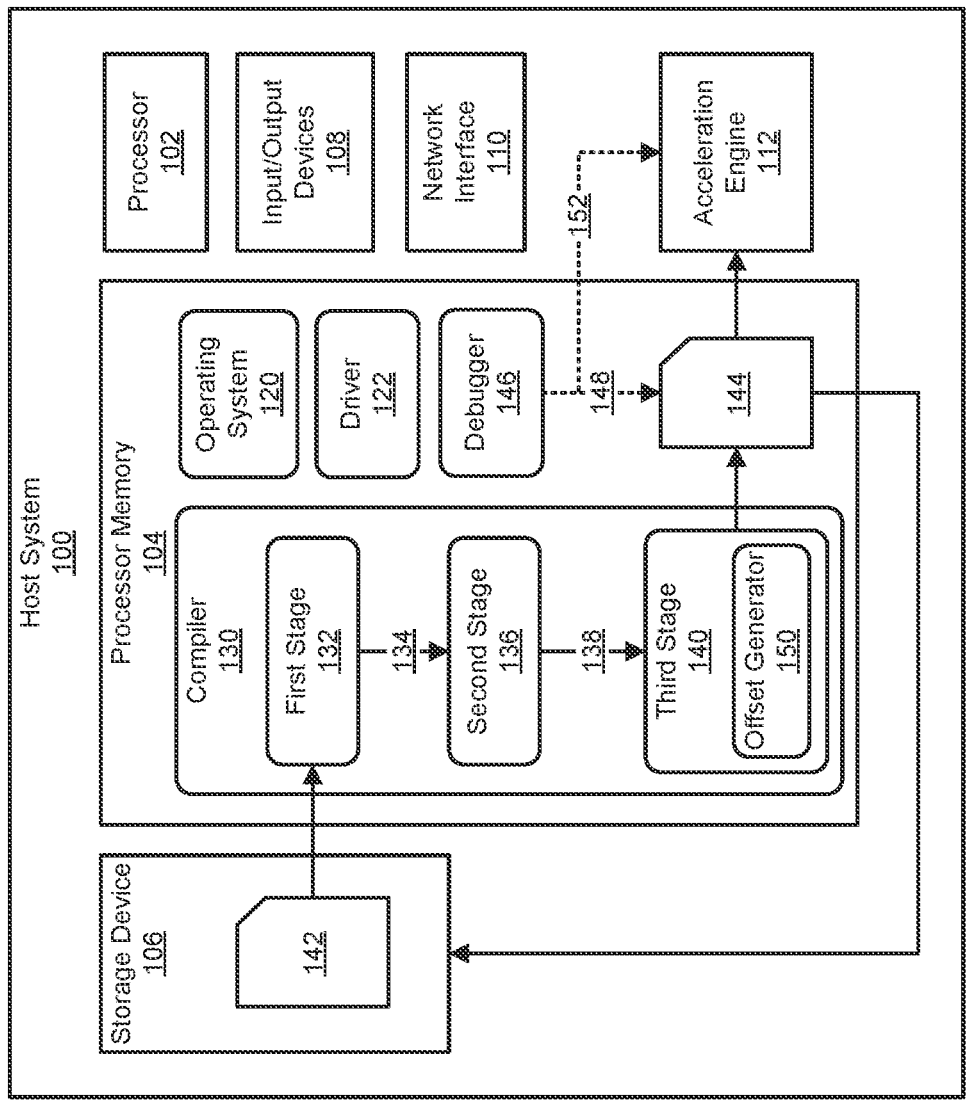
FIG. 1 includes a block diagram illustrating an example of a host system on which a compiler and a debugger can run.

When a neural network is compiled into instructions, a compiler may generate a set of instructions in which different portions of the set of instructions correspond to different layers of the neural network. The compiler may further break the instructions down into sets of instructions for execution on multiple engines or processors of a particular integrated circuit device or across multiple integrated circuit devices. A runtime application, which orchestrates the execution of the neural network, may decide how many accelerators are to be used for executing the instructions, and may furthermore add additional instructions into the instruction stream. To perform debugging on the neural network, a machine learning engineer or other user may want to examine the behavior of the multiple engines and/or the data at a single point in the execution of the neural network, such as immediately prior to a particular target layer. Because the engines receive different sets of instructions, different engines may arrive at the instructions corresponding to the target layer at different times. Therefore, halting the engines simultaneously may result in some engines having already executed some instructions corresponding to the target layer while other engines may still be executing instructions prior to the target layer.

Examples herein address these and other issues by providing techniques for setting breakpoints while debugging a neural network being executed by multiple execution engines. Examples described herein allow users to examine the data at various points in the neural network as well as to examine the behavior of the multiple engines executing instructions associated with the neural network. While the execution of a neural network is stopped, different variables and weights of the neural network can be manipulated, thereby allowing engineers to optimize the neural network while interacting at a high level of abstraction.

Some embodiments herein set a breakpoint in a neural network by first receiving a user input indicating a target layer of the neural network. A compiler that generates machine-level instructions for a neural network can assist in setting breakpoints in the neural network. When the compiler is generating a set of instructions from the source code for the neural network, the compiler can generate an offset corresponding to a starting instruction of each layer. The compiler may further generate multiple sets of instructions for each of the execution engines that are to carry out the overall execution of the neural network. A runtime application can determine an adjusted offset should the application add additional instructions to the set of instructions. In some implementations, an adjusted offset is determined for each of the execution engines based on the offset generated by the compiler and the positioning of instructions within each set.

A debugger application can subsequently set a breakpoint in the instructions for the neural network, upon receiving user input indicating a target layer. The debugger can set halt points in the sets at or near (e.g., immediately prior to or immediately after) the adjusted offsets. When an application is being executed by a host processor, the application may cause the sets of instructions to be transferred to the instruction buffers of the execution engines sequentially or concurrently. When any of the execution engines executes a halt point (e.g., a halt instruction), that particular execution engine stops further execution of instructions. In some instances, when it is determined that operation of a single execution engine has halted, the remaining execution engines are also caused to halt. The debugger may detect that the execution engines have halted and may automatically cause the remaining execution engines to move through instructions until all execution engines have reached the halt point. Alternatively, the debugger may allow a user to manually step through instructions at the remaining execution engines until all execution engines have reached the halt point. In some instances, the debugger may then notify the user that the breakpoint has been reached.

Various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 includes a block diagram illustrating an example of a host system 100 on which a compiler 130 and a debugger 146, such as are described herein, can run. The illustrated host system 100 is an example of a computing device, and includes a processor 102, a processor memory 104, at least one storage device 106, various Input/Output (I/O) devices 108, and at least one network interface 110. In the example of FIG. 1, the host system 100 also includes an acceleration engine 112, which is an integrated circuit device that can accelerate certain operations or computations performed by the host system 100. In various examples, the host system 100 can be implemented as a server in a data center, a desktop computer, a laptop computer, a tablet computer, or a smartphone, among other examples. In some examples, operations or components discussed below as performed or included in the host system 100 can be performed or included in other computer devices. For example, the compiler 130 can execute on the host system 100 while the acceleration engine 112 is located at a different host system.

The processor 102 is an integrated circuit device that can execute program code, in the form of instructions. The program code can be used for various software applications or tools, such as an operating system 120, the debugger 146, or the illustrated compiler 130. While the processor 102 is executing a program, the instructions for the program can be stored in the processor memory 104. The instructions can also be stored elsewhere, such as on the storage device 106, and can be loaded into the processor memory 104 when needed by the processor 102. The processor 102 can also use the processor memory 104 for temporary storage of other data on which the processor 102 is operating. In various examples, the processor memory 104 is a volatile memory type, such as a type of Random Access Memory, though non-volatile memory types can, alternatively or additionally, be used for the processor memory 104.

The storage device 106 is an example of a device that can include non-volatile memory. For example, the storage device 106 can be a magnetic disk drive, a solid state drive, or an optical drive, among other examples. The storage device 106 can further be non-transitory, such that program code and other data stored on the storage device 106 remains present when the storage device 106 is not powered on.

The storage device 106 is one example of a peripheral device, which are components that can be coupled to the host system 100 to add functionality to the host system 100. Other examples of peripheral devices include the Input/Output devices 108 and the network interface 110. The Input/Output devices 108 can include user input and output devices, such as keyboards, mice, touch screens, microphones, display screens, speakers, printers, and scanners, among other examples. The network interface 110, which can be implemented using a network interface card, can provide access to one or more networks. The network interface 110 can include, for example, a physical port for connecting a network cable and/or wireless antennas for communicating with Wi-Fi and/or cellular networks. The network interface 110 can also be described as an I/O device.

The acceleration engine 112 is also another type of peripheral device or I/O device. The acceleration engine 112 is a device that is purpose built to perform certain operations that can be performed by the processor 102, but can be performed faster by the acceleration engine 112. For example, the acceleration engine 112 can be a neural network accelerator, and, as such, may be able to perform the large scale, parallel computations of a neural network more efficiently than when the computations are performed by the processor 102. As another example, the acceleration engine 112 can be a graphics processing unit (GPU), and may be optimized to perform the computations needed for graphics rendering. Other examples of devices that can be implemented by the acceleration engine 112 include cryptographic accelerators, compression and decompression accelerators, 3-D accelerators, regular expression accelerators, security accelerators, and others.

In various examples, the acceleration engine 112 can execute program code to perform certain operations. For example, when the acceleration engine 112 is a neural network accelerator, the acceleration engine 112 can be programmed to execute a particular neural network, such as one that performs image recognition or one that performs machine translation. As a further example, to support the execution of a neural network, the acceleration engine 112 can be programed to perform operations such as copying data for the neural network from processor memory 104 (for example) into the acceleration engine 112, copying input data for the neural network from processor memory 104 into the acceleration engine 112, and/or copying results from the acceleration engine 112 into the processor memory 104, among other examples.

To generate program code for the acceleration engine 112, in various examples, the host system 100 can execute the compiler 130. Compilers, in general, are software programs that translate program code written in a human-readable language into a format (e.g., machine instructions) that can be read and processed by an integrated circuit device. In the example of FIG. 1, the acceleration engine 112 is a neural network accelerator and the compiler 130 is for compiling a neural network description into instructions to be executed on the acceleration engine 112. When the acceleration engine 112 implements a different type of accelerator, another compiler can be used.

The compiler 130 can be activated, for example, when the operating system 120 receives keyboard, mouse, touchscreen, voice commands, or other inputs from the Input/Output devices 108. The inputs can further include parameters for the compiler 130, such as the input code 142 to compile and configuration options for the compilation process. Once the compiler 130 is activated, the processor 102 can load the instructions for the compiler 130 into the processor memory 104, and can execute the instructions.

In the example of FIG. 1, the compiler 130 includes a first stage 132, a second stage 136, and a third stage 140, which each perform different operations to produce compiled code 144. In other examples, the compiler 130 can combine the operations of the first stage 132, second stage 136, and/or third stage 140 into fewer stages, or can divide the operations of one of the stages into multiple stages.

The first stage 132 can receive and process input code 142. The input code 142 can describe a program in a high-level programming language, such as Java, C++, or Tensorflow, among many other examples. The input code 142 can describe, for example, steps to perform image recognition, speech recognition, machine translation, or other operations. The input code 142 can be obtained, for example, from the storage device 106. Alternatively, though not illustrated here, the input code 142 may be located in the processor memory 104 or can be obtained from a network location, using the network interface 110. Processing of the input code 142 can include sorting the operations described in the input code 142 into layers, where the outputs of one layer provide the inputs to a next layer. Processing can also include identifying steps to be performed by the processor 102, rather than by the acceleration engine 112. For example, the processor 102, through the execution of a driver 122, may need to perform steps such as configuring Direct Memory Access (DMA) descriptors for moving data into or out of the acceleration engine 112, among other examples.

The output 134 of the first stage 132 can be organized, for example, in the layers, nodes, and connections between nodes of a neural network. The second stage 136 can perform intermediate processing on this output 134. For example, the operations performed in any one layer, or at any one node in a layer, may be too many for the acceleration engine 112 to perform at the same time. The acceleration engine 112 may, for example, have a limited amount of local storage space for the data needed for a computation, or the computations may be more than the acceleration engine 112 can perform at one time. In this example, the first stage 132 can break the operations of the layer or node down into smaller operations, which can fit into the acceleration engine's local memory and/or can fit into the computing capacity of the acceleration engine 112. Processing of the output 134 of the first stage 132 can include other steps, such as scheduling, or determining the order in which the acceleration engine 112 and/or processor 102 will perform operations, among other examples.

In various examples, the output 138 of the second stage 136 includes the various steps to be performed by components of the acceleration engine 112, in the order that the steps are to be performed. The output 138 can be represented, for example, as a data flow graph, where the nodes in the graph represent memory operations, computations, and other operations, and the edges or connections between the nodes represent dependencies between the nodes, such as data dependencies, memory dependencies, or operational dependencies, among other examples.

The third stage 140 can operate on the output 138 of the second stage 136, and perform various steps before producing the instructions that are to be executed by the acceleration engine 112. These steps can include, for example, removing redundant dependencies, resolving or handling dependencies between nodes by inserting synchronization instructions into the code, identifying possible optimizations in memory usage or memory bandwidth usage, and other operations.

The output of the third stage 140 is compiled code 144, which may include machine instructions in binary format. In some examples, the compiled code 144 can be stored in the processor memory 104. Alternatively or additionally, the compiled code 144 can be copied to the storage device 106 or to a network location. As noted above, the acceleration engine 112 may be located at a different host system, in which case the compiled code 144 can be sent over the network interface 110 to the other host system.

In some examples, the third stage 140 can include an offset generator 150 that creates a mapping between features of the neural network and specific instructions of the compiled code 144 (e.g., the instruction stream). The offset generator 150 may determine the locations of specific instructions that correspond to the beginning of a layer of the neural network, the end of a layer, the beginning of the operations of a node, the end of the operations of a node, and the like. The offset generator 150 may further determine the locations of specific instructions that correspond to different computations within a particular node, such as a one-dimensional convolution, a two-dimensional convolution, a matrix multiply, a summation, and the like. In some instances, the offset generator 150 records the offsets of the instructions from a reference point, such as the beginning of the instruction stream or an instruction for which an offset was previously generated. In some instances, the generated offsets comprise instruction identifiers that allow specific instructions within the instruction stream to be identified. The generated offsets may be stored on the processor memory 104 and/or be included in the compiled code 144.

In the example of FIG. 1, the host system 100 can execute a driver 122, which can also be referred to as a device driver or runtime driver, that manages the acceleration engine 112. The driver 122 can provide an interface between applications executing on the host system 100 (or on another host system) and the acceleration engine 112. For example, the driver 122 can provide an Application Program Interface (API) that defines functions for feeding input data to the acceleration engine 112 and defining the operation to perform on the input data. In this and other examples, the driver 122 can configure the acceleration engine 112 to perform the operation. For example, the driver 122 can identify a neural network that the acceleration engine 112 is to execute, as well as the location in the processor memory 104 or on the storage device 106 where the compiled code 144 for the neural network is located. The driver 122 can further load into the acceleration engine 112 or cause the acceleration engine 112 to load the compiled code 144, can load or cause the acceleration engine 112 to load the input data on which the neural network is to operate, and/or can cause the acceleration engine 112 to begin executing on the input data. Once the acceleration engine 112 has finished, the acceleration engine 112 can notify the driver 122, and the driver 122 can deliver a result back to the application that requested the result.

In some embodiments, the host system 100 can be execute a debugger 146, an application that can be used to debug, examine, and/or improve the functionality of the neural network. The debugger 146 may allow a user to examine the inputs and outputs of different layers and nodes of the neural network by setting breakpoints in the compiled code 144. A breakpoint is a point at which executing code will halt further execution, with all execution state prior to the breakpoint being preserved. In various examples, a breakpoint can be assigned to a specific instruction, a particular function call, a program counter value, or an otherwise-identified part of a program's code. Once a breakpoint is reached, the debugger can enable a user to see the current values of variables, the current contents of system memory, and/or to step through the program code one or multiple instructions at a time, among other operations.

In some instances, to insert a breakpoint, the debugger 146 can modify the compiled code 144 by, for example, setting/inserting halt points into the code (e.g., by inserting a halt instruction between two already existing instructions, by modifying a halt bit of an already existing instruction, etc.). The halt points may be set within the compiled code 144 prior to transferring the code to the acceleration engine 112 (as indicated by dashed line 148) or subsequent to transferring the code to the acceleration engine 112 (as indicated by dashed line 152). The debugger 146 may read from the offset generator 150 to determine the locations at which the halt points are to be set. As described herein, when the compiled code 144 is transferred to multiple execution engines within the acceleration engine 112, the debugger 146 may calculate adjusted offsets to determine the locations at which the halt points are to be set.

The debugger 146 may operate on the host system 100 concurrently with the operating system 120, the compiler 130, the driver 122, and/or the application that invokes operation of the acceleration engine 112. In one particular implementation, a user causes the host system 100 to be powered on and the operating system 120 is initialized. Using the operating system 120, the user can cause the compiler 130 to generate the compiled code 144 and may thereafter invoke the debugger 146 to analyze the compiled code 144. The user then initializes the application that invokes operation of the acceleration engine 112 and uses the debugger 146 to debug the neural network. In some examples, the compiled code 144 is generated prior to powering on the host system 100. Upon powering on the host system 100, the user initializes the debugger 146 and then initializes the application that invokes operation of the acceleration engine 112, or alternatively, the user initializes the application and subsequently initializes the debugger 146. Other possibilities are contemplated.

Figure 2:
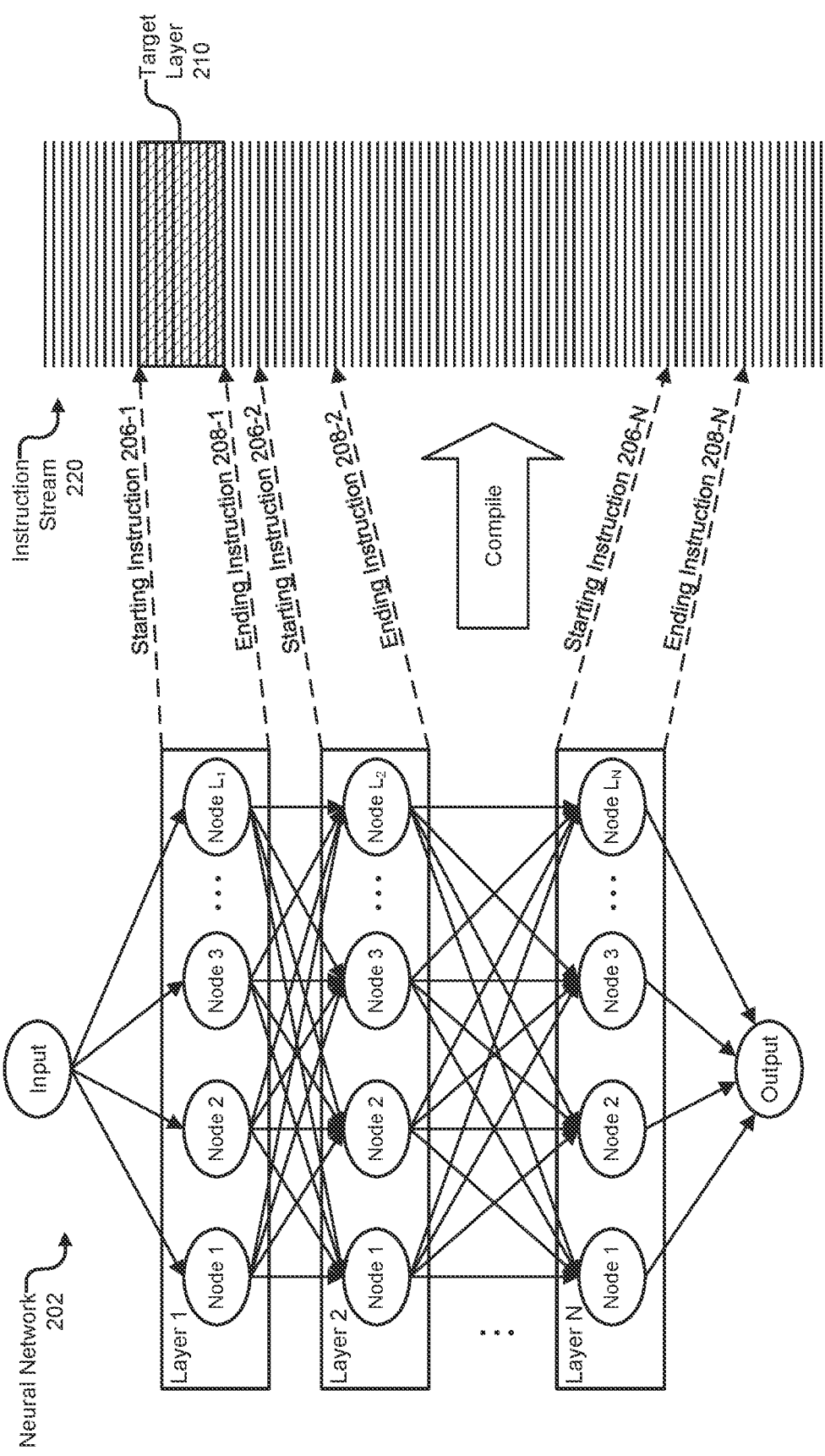
FIG. 2 includes a diagram illustrating an example of a neural network being compiled into an instruction stream.

FIG. 2 includes a diagram illustrating an example of a neural network 202 being compiled into an instruction stream 220. FIG. 2 further illustrates a mapping between different features of the neural network 202 and specific instructions of the instruction stream 220. For example, each of the layers of the neural network 202 may be mapped to a starting instruction 206 and an ending instruction 208. The offsets corresponding to the starting instructions 206 and the ending instructions 208 are discoverable by the debugger from metadata included with the instructions stream 220. A compiler, for example, that generates the instruction stream 220 can also generate metadata that includes a listing of offsets within the instruction stream of the starting instructions 206 and/or the ending instructions 208.

In various examples, the offsets enable the setting of breakpoints in the instruction stream 220. For example, a user may specify a target layer 210 of the neural network 202 that the user may wish to examine (e.g., "Layer 1"), and the debugger may determine the set of instructions within the instruction stream 220 that correspond to the target layer. Alternatively or additionally, the debugger may determine the offset corresponding to the starting instruction 206-1 and/or the offset corresponding to the ending instruction 208-1.

Figure 3A:
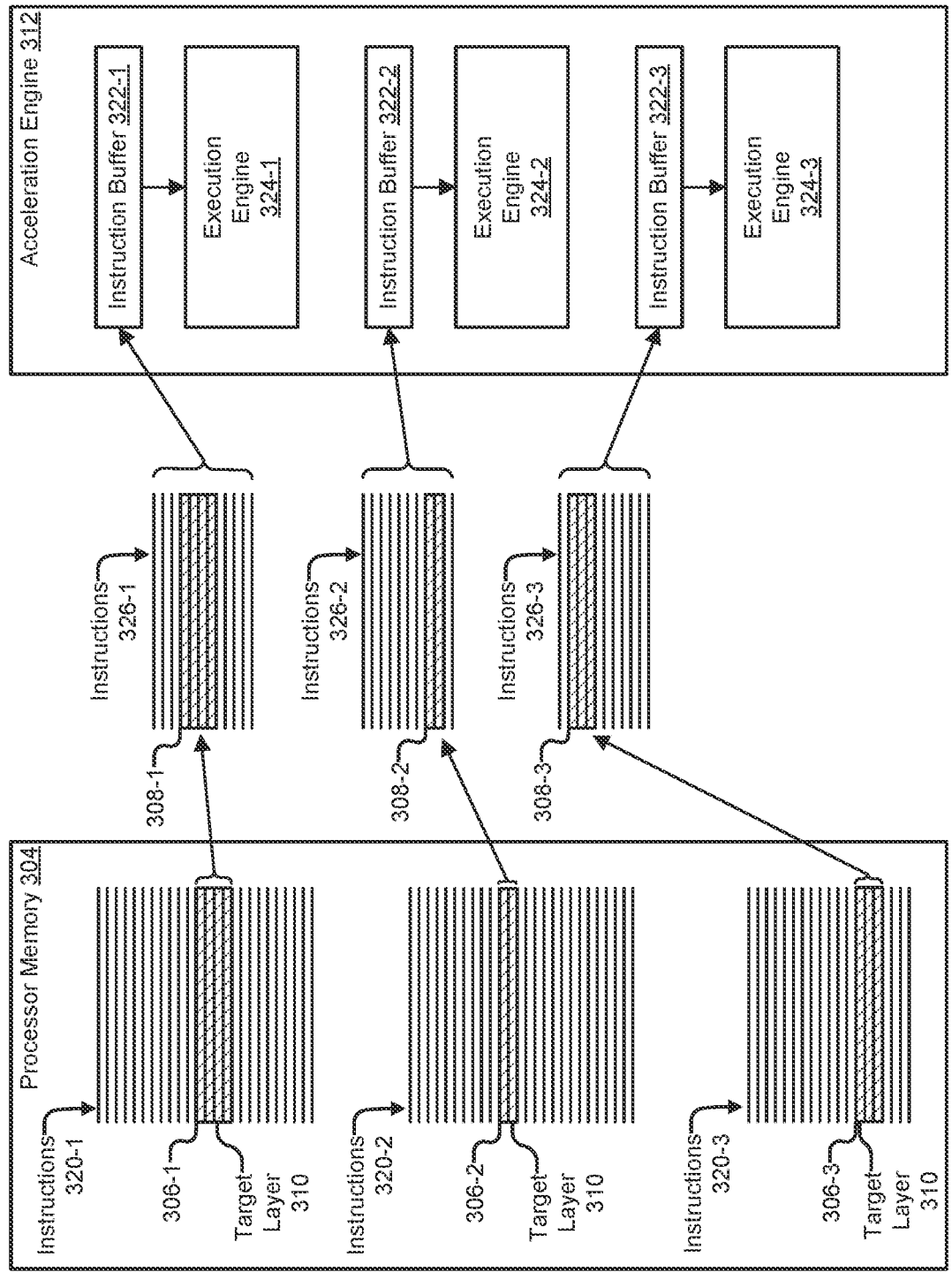
FIGS. 3A and 3B include examples of diagrams illustrating a transfer of instructions from a processor memory to multiple instruction buffers on an acceleration engine.
Figure 3B:
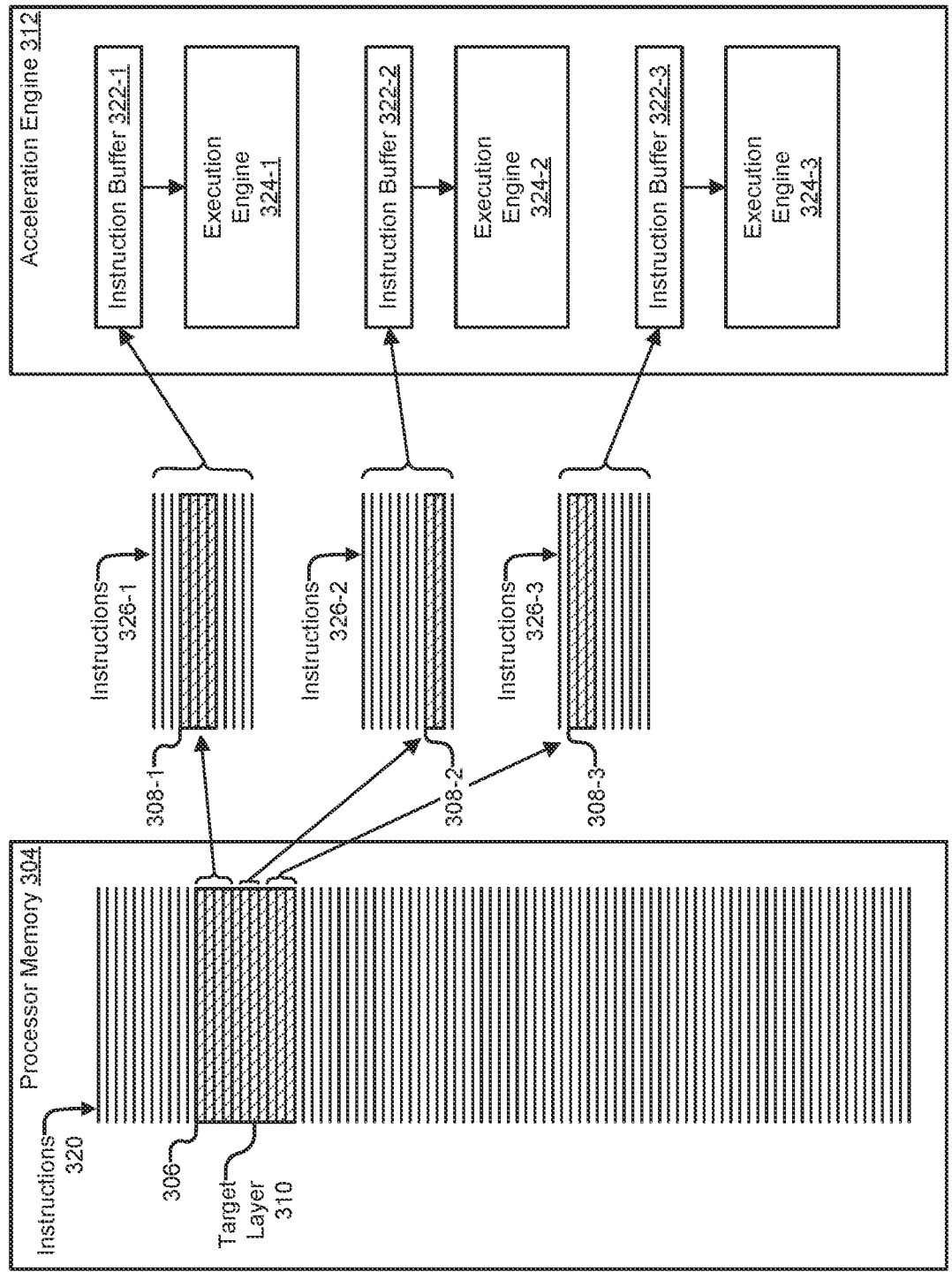

FIGS. 3A and 3B include diagrams of examples illustrating a transfer of instructions from a processor memory 304 to multiple instruction buffers 322 on an acceleration engine 312. Each of the instruction buffers 322 can temporarily hold and feed instructions to one of multiple execution engines 324. Although depicted in FIGS. 3A and 3B as being separate from the execution engines 324, in some embodiments the instruction buffers 322 are integrated into the execution engines 324 and are considered components thereof.

In reference to FIG. 3A, an example is shown in which the compiler generates multiple instruction streams 320 that are stored in the processor memory 304. In this example, different sets of instructions from the different instruction streams 320 stored in the processor memory 304 are transferred to different instruction buffers 322, with each set having different instructions of the target layer 310. Instructions in the target layer 310 may accordingly be dispersed between the instruction streams 320. Prior or subsequent to the transfer of the sets of instructions, the runtime driver may add, remove, and/or modify instructions from the sets of instructions in the different instruction streams 320. In the illustrated example, the five instructions of the target layer 310 of the first instruction stream 320-1 stored in the processor memory 304 are transferred to the first instruction buffer 322-1 as part of a first set of instructions 326-1. The first set of instructions 326-1 may include additional instructions besides those in the target layer 310, which may be instructions taken from the first instruction stream 320-1 outside of the target layer 310 or additional instructions generated by the host system to facilitate transfer to and/or processing at the acceleration engine 312.

Further in the illustrated example, the subsequent three instructions of the target layer 310 of the second instruction stream 320-2 stored in the processor memory 304 are transferred to the second instruction buffer 322-2 as part of a second set of instructions 326-2. The second set of instructions 326-2 may include additional instructions besides those in the target layer 310, which may be instructions taken from the second instruction stream 320-2 outside of the target layer 310 or additional instructions generated by the host system to facilitate transfer to and/or processing at the acceleration engine 312. The subsequent four instructions of the target layer 310 of the third instruction stream 320-3 stored in the processor memory 304 are transferred to the third instruction buffer 322-3 as part of a third set of instructions 326-3. Similar to that described above, the third set of instructions 326-3 may include additional instructions besides those in the target layer 310, which may be instructions taken from the third instruction stream 320-3 outside of the target layer 310 or additional instructions generated by the host system to facilitate transfer to and/or processing at the acceleration engine 312.

In reference to FIG. 3B, an example is shown in which the compiler generates a single instruction stream 320 that is stored in the processor memory 304. In this example, different sets of instructions in the instruction stream 320 stored in the processor memory 304 are transferred to different instruction buffers 322, with each set having different instructions of the target layer 310. Prior or subsequent to the transfer of the sets of instructions 326, the runtime driver may add, remove, and/or modify instructions from the sets of instructions 326. These changes may be to change the execution of the sets based on current runtime conditions, and can change the exact offsets of the starting instructions 308 of the target layer 310.

Each of the sets of instructions 326 can include some instructions for the target layer 310. In the illustrated example, the first five instructions of the target layer 310 of the instruction stream 320 stored in the processor memory 304 are transferred to the first instruction buffer 322-1 as part of a first set of instructions 326-1. The first set of instructions 326-1 may include additional instructions besides those in the target layer 310, which may be instructions taken from the instructions 320 outside of the target layer 310 or additional instructions generated by the host system to facilitate transfer to and/or processing at the acceleration engine 312.

Further in the illustrated example, the subsequent three instructions of the target layer 310 of the instruction stream 320 stored in the processor memory 304 are transferred to the second instruction buffer 322-2 as part of a second set of instructions 326-2. The second set of instructions 326-2 may include additional instructions besides those in the target layer 310, which may be instructions taken from the instruction stream 320 outside of the target layer 310 or additional instructions generated by the host system to facilitate transfer to and/or processing at the acceleration engine 312. The subsequent four instructions of the target layer 310 of the instruction stream 320 stored in the processor memory 304 are transferred to the third instruction buffer 322-3 as part of a third set of instructions 326-3. Similar to that described above, the third set of instructions 326-3 may include additional instructions besides those in the target layer 310, which may be instructions taken from the instruction stream 320 outside of the target layer 310 or additional instructions generated by the host system to facilitate transfer to and/or processing at the acceleration engine 312.

In reference to both FIGS. 3A and 3B, in some instances, the sets of instructions 326 are transferred to the instruction buffers 322 with the use of direct memory access (DMA) over small portions. For example, the acceleration engine 312 may include one or more DMA engines configured to retrieve the sets of instructions 326 from the instruction stream(s) 320. In one example, each of the instruction buffers 322 has a size of 12 kB and the sets of instructions 326 are transferred in 4 kB portions. Other embodiments may enable larger instructions buffers in which the size of each transferred portion may increase accordingly.

In order to set halt points at the proper locations, the debugger may determine three adjusted offsets corresponding to starting instructions 308 of the target layer 310 within the sets of instructions 326. The adjusted offsets may need to be determined due to instructions having been added to the sets of instructions 326 by the runtime driver. Each adjusted offset may be determined based on the previously determined (e.g., by a compiler) offset corresponding to the starting instruction(s) 306 of the target layer 310 within the instruction stream(s) 320. For example, the debugger may determine, based on the offset corresponding to the starting instruction(s) 306, a first adjusted offset corresponding to a first starting instruction 308-1 of the target layer 310 within the first set of instructions 326-1, a second adjusted offset corresponding to a second starting instruction 308-2 of the target layer 310 within the second set of instructions 326-2, and a third adjusted offset corresponding to a third starting instruction 308-3 of the target layer 310 within the third set of instructions 326-3.

Upon determining the adjusted offsets, the debugger can set a halt point within each of the sets of instructions 326. Each of the three halt points may be set at the starting instructions 308 (e.g., by replacing the starting instructions 308 with the halt instructions or by setting the halt bit of the starting instructions 308) or immediately prior to the starting instructions 308 (e.g., by inserting halt instructions between the starting instructions 308 and the previous instructions or by setting the halt bit of the previous instructions).

In accordance with a first example, the halt points are set prior to transferring the sets of instructions 326 to the instruction buffers 322. In this example, the runtime driver keep track of where each block of instructions was placed in the processor memory 304. Thus, using the offsets (or adjusted offsets), the debugger, with assistance from the runtime driver, can locate in the starting instructions 308 in the processor memory 304 in order to set halt points. and can notify the DMA engines where to find the blocks. The runtime driver can also determine if any instructions were added and can accordingly derive the location of the starting instructions in the processor memory 304.

In some examples, the halt points are set after transferring the sets of instructions 326 to the instruction buffers 322. In these examples, the runtime driver may not have knowledge of what is currently loaded in the instruction buffers and may therefore speculatively set the halt points in the instruction buffers 322. The runtime driver may analyze the most recent descriptors executed by the DMA engines to determine the current content of the instruction buffers 322. If the previously-executed instructions indicate that a block of instructions that include the instruction at the offset has already been copied to an instruction buffer, then the runtime driver and/or the debugger can assume that the instruction is in the instruction buffer. The debugger, possibly with assistance from the runtime driver, can then use the offset to find the instruction in the instruction buffer. The debugger can then set a halt point at or before the instruction.

In some cases, it may not be possible to determine exactly which instructions are in the instruction buffer. For example, the acceleration engine 312 may be actively executing instructions when the debugger is instructed to set a halt point, in which case, the block of instructions that include the instruction that is being searched for can be in the process of being copied to an instruction buffer, can be already in an instruction buffer, or can have already been executed. The runtime driver and/or the debugger can thus assume, without verifying, that the instruction that is being searched for is in the instruction buffer. Using the offset (or adjusted offset), the debugger (possibly with assistance from the runtime driver) can set a halt point at or before an instruction in the instruction buffer, on the assumption that the instruction is the sought after instruction. If the instruction is, in fact, the instruction being searched for, then, when the execution engine halts on this instruction, the desired halt point has been reached. If the instruction is not the correct instruction, then the debugger and/or the runtime driver can identify the instruction that was halted on. When this instruction is earlier in the program than the instruction at which the halt point is supposed to be, then the runtime driver can release the halt. In this case, the sought for instruction will be loaded in to the instruction buffer at a later time, and the correct halt point will be reached. When the instruction that is halted at is later in the program than the instruction where the halt point is supposed to be, then the debugger has missed the opportunity to set the halt point. The debugger can inform the user that this is the case, and the user can determine what to do next (e.g., let execution of the instructions continue, or reset and restart the instructions, so that the halt point can be reached).

Figure 4:
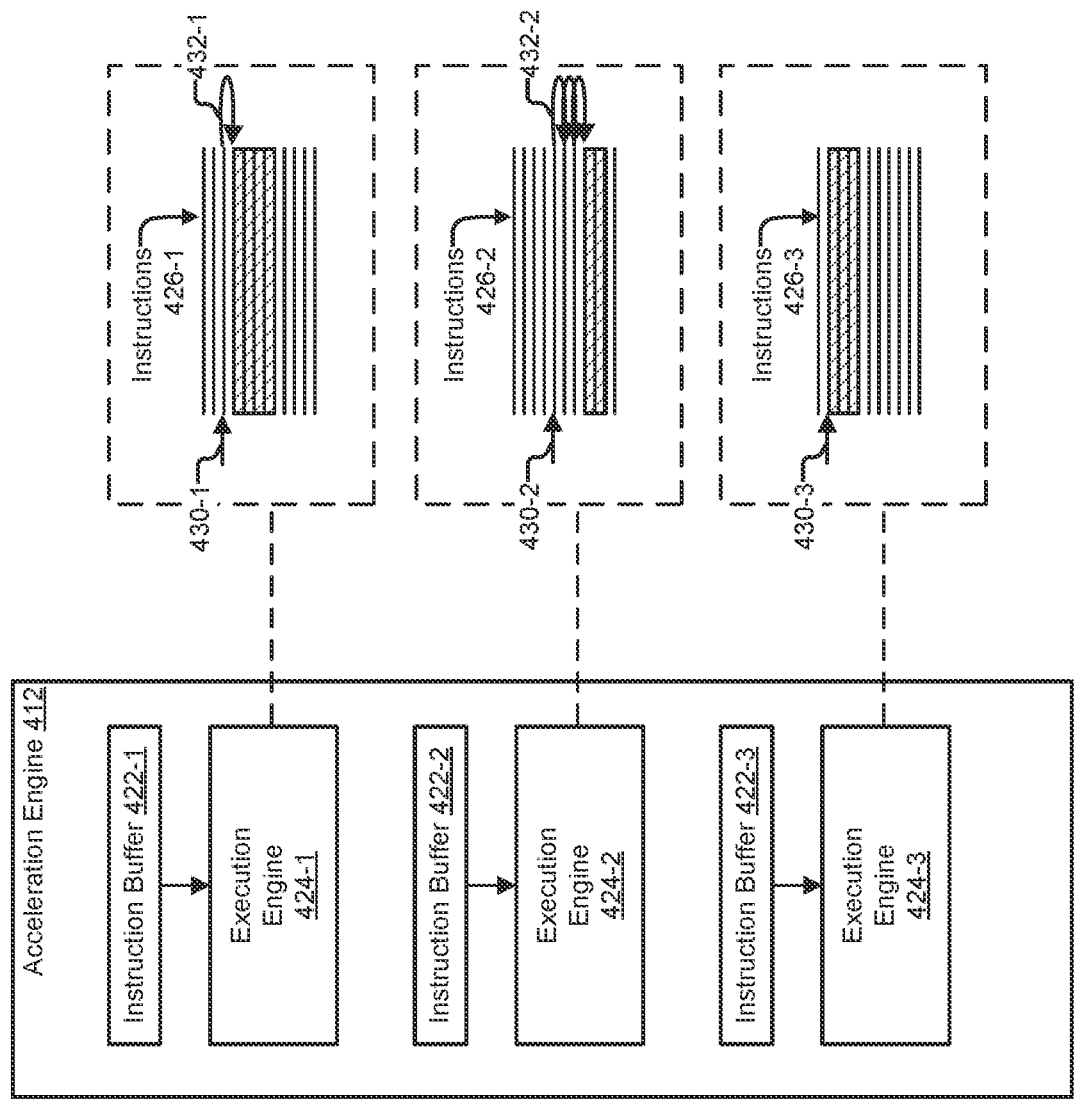
FIG. 4 illustrates an example of an acceleration engine having various execution engines that are executing sets of instructions.

FIG. 4 illustrates an example of an acceleration engine 412 having three execution engines 424 that are executing sets of instructions 426. The execution engines 424 execute instructions one-by-one until a halt point is reached by any one of the execution engines 424, as halting the operation of a single execution engine causes the remaining execution engines to also halt. The debugger detects that the execution engines 424 have halted and determines which of the execution engines 424 reached the breakpoint (i.e., the halt point). The debugger may be notified that the execution engines 424 have halted by receiving a notification from the execution engines 424 through the runtime driver. The debugger then causes, through the runtime driver, the remaining execution engines that have not yet reached the halt point to move through instructions until reaching the halt point.

In the illustrated example, pointers 430 indicate the last executed instructions when operation of the execution engines 424 were halted. The third pointer 430-3 shows that the third execution engine 424-3 was the first execution engine to reach the halt point (e.g., the third pointer 430-3 is pointed to the starting instruction of the target layer within the third set of instructions 426-3, where the halt point was previously set), which caused the third execution engine 424-3 as well as the first and second execution engines 424-1, 424-2 to halt. The debugger determines that only the third execution engine 424-3 has reached the halt point, and accordingly causes the first execution engine 424-1 to perform a single step 432-1 (execute a single additional instruction) until arriving at the halt point and the second execution engine 424-2 to perform three steps 432-2 (execute three additional instructions) until arriving at the halt point. The debugger then notifies the user that the breakpoint has been reached.

In some embodiments, the debugger may determine that the breakpoint has been missed by, for example, determining that at least one of the execution engines has failed to reach a halt point after a predetermined number of steps have been performed. As another example, the debugger may determine that at least one engine has halted after the breakpoint and has executed at least one instruction after the breakpoint. In either case, the debugger may inform the user that the breakpoint was missed and the user can restart execution of the neural network to then reach the breakpoint.

Figure 5A:
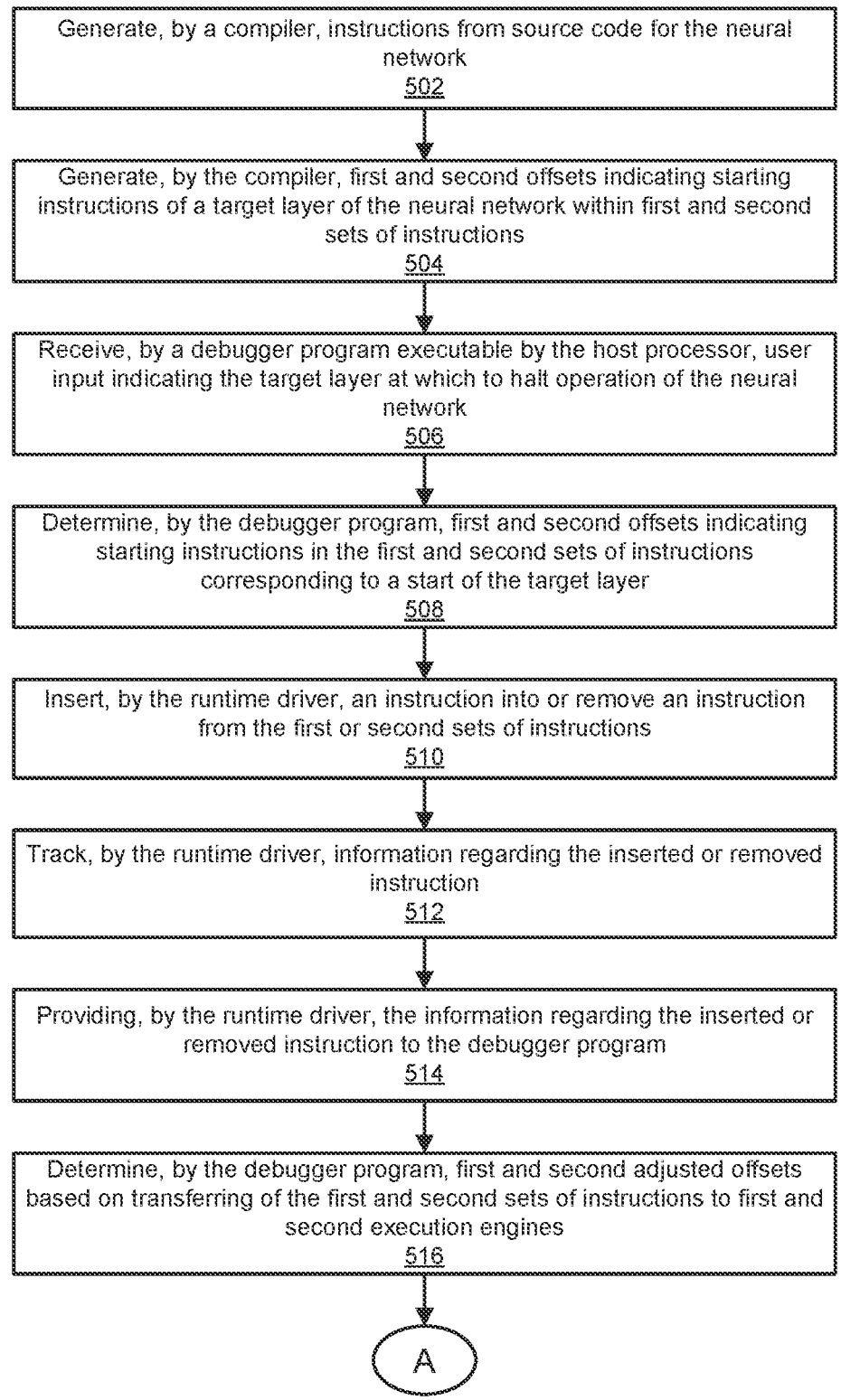
FIGS. 5A and 5B include a flowchart illustrating a method of setting breakpoints for debugging neural networks.
Figure 5B:
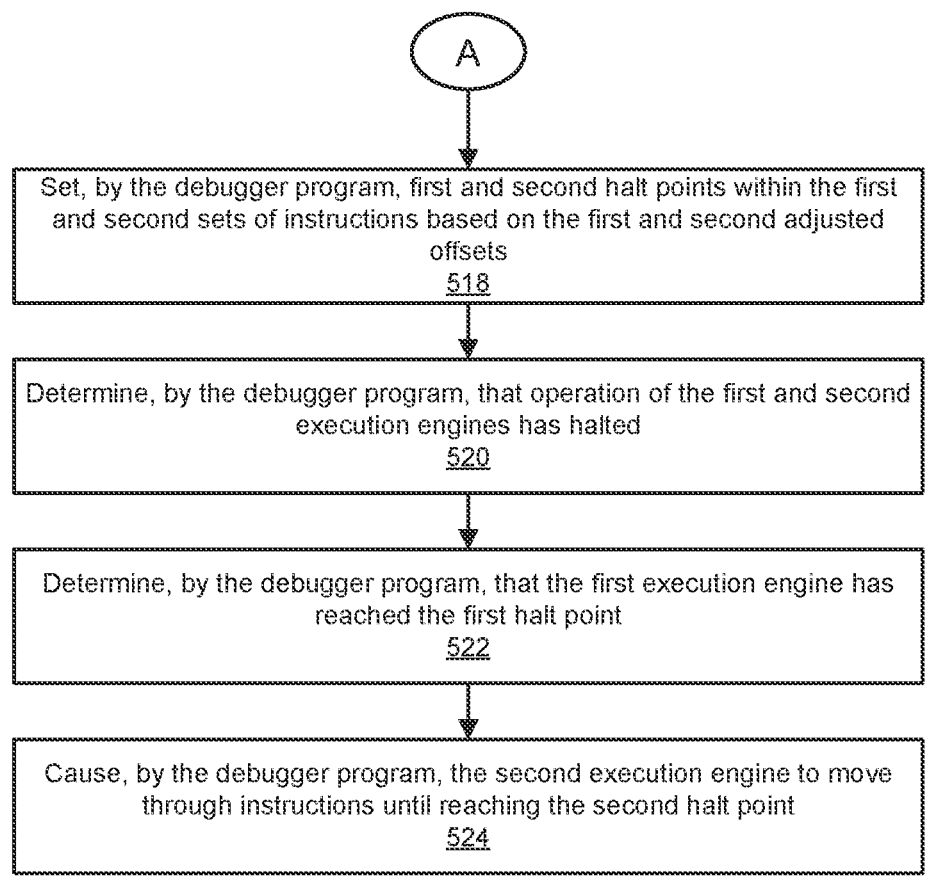

FIGS. 5A and 5B include a flowchart illustrating a method 500 of setting a breakpoint for debugging a neural network. These methods may be implemented by the systems described above, such as for example the host system and the components therein as described in reference to FIGS. 1-4. One or more steps of the method 500 may be performed in a different order than that shown in the illustrated embodiment, and one or more steps may be omitted during performance of the method 500.

At step 502, instructions are generated from source code for the neural network. The instructions may include a first set of instructions to be executed by a first execution engine of an integrated circuit device and a second set of instructions to be executed by a second execution engine of the integrated circuit device. The instructions may be generated by a compiler. The compiler may be executable by a host processor or by a device external to the host system. The instructions may include one or more instruction streams. In one example, a single instruction stream may be generated to include both the first set of instructions and the second set of instructions. In another example, a first instruction stream may be generated to include the first set of instructions and a second instruction stream may be generated to include the second set of instructions.

At step 504, a first offset and a second offset are generated. The first offset may indicate a starting instruction in the first set of instructions corresponding to a start of a target layer and the second offset may indicate a starting instruction in the second set of instructions corresponding to the start of the target layer. The offsets may be generated by the compiler concurrently with generating the instructions (e.g., while generating the instruction stream(s)). In other words, step 504 may be performed concurrently with step 502. The offsets may be stored in the processor memory and/or in the compiled code itself, e.g., in metadata associated with the compiled code (i.e., instructions). In some embodiments, the compiler provides the offsets to the debugger by sending the offsets to the debugger program or by allowing the debugger program to retrieve or determine the offsets.

At step 506, user input indicating the target layer of the neural network at which to halt execution of the neural network may be received. The user input may be received by the debugger program via an input device of the host system and/or from an application executing on the host processor.

At step 508, the first offset and the second offset are determined. The offsets may be determined by the debugger program by examining data associated with the set of instructions generated by the compiler. In some embodiments, the debugger program searches the instructions or the metadata associated with the instructions for the offsets. In some embodiments, the debugger program accesses the offsets within the processor memory.

At step 510, a runtime driver inserts an instruction into or removes an instruction from the instructions generated by the compiler. For example, the runtime driver may add/remove the instruction to/from the first set of instructions or the second set of instructions in preparation of or during transferring the sets of instructions to the instruction buffers. In some instances, multiple instructions may be added and/or removed from the sets of instructions.

At step 512, the runtime driver tracks information regarding the inserted or removed instruction. The information regarding the inserted or removed instruction may include the location of the inserted/removed instruction, the length of the inserted/removed instruction, whether the instruction was inserted into or removed from the first set of instructions or the second set of instructions, among other possibilities. The runtime driver may store the information regarding the inserted or removed instruction in the processor memory. In some embodiments, the debugger program may instruct the runtime driver to track the information such that the information is only tracked when the debugger program is running.

At step 514, the runtime driver provides the information regarding the inserted or removed instruction to the debugger program. In some instances, the debugger program may query the runtime driver for the information and in response the runtime driver may provide the information. In some embodiments, the runtime driver may send the information to the debugger program upon the runtime driver tracking the information (i.e., upon the availability of the information).

At step 516, a first adjusted offset and a second adjusted offset are determined. The adjusted offsets may be determined by the debugger program and/or the runtime driver. The first adjusted offset may be determined based on a transferring of the first set of instructions to an instruction buffer of the first execution engine and the second adjusted offset may be determined based on a transferring of the second set of instructions to an instruction buffer of the second execution engine. In some instances, one or both of the adjusted offsets may be determined based on the information regarding the inserted or removed instruction. For example, in preparation for transferring the sets of instructions to the instructions buffers, one or more instructions may be added to or removed from the sets of instructions. As another example, during the transfer of the sets of instructions to the instruction buffers, one or more instructions may be added to or removed from the sets of instructions. As another example, in resolution of the transfer of the set of instructions to the instruction buffers, one or more instructions may be added to or removed from the sets of the instructions while in the instruction buffers. In any of these examples, the added or removed instructions may be tracked by the runtime driver to facilitate in determining one or both of the adjusted offsets (e.g., a removed instruction may cause an adjusted offset to decrement and an added instruction may cause an adjusted offset to increment).

At step 518, a first halt point is set within the first set of instructions based on the first adjusted offset and a second halt point is set within the second set of instructions based on the second adjusted offset. The halt points may be set by the debugger program and/or the runtime driver. The halt points may be set prior to or subsequent to the transferring of the sets of instructions to the instruction buffers. The halt points may be set by inserting a halt instruction between two already existing instructions or by modifying a halt bit of an already existing instruction.

At step 520, it is determined that operation of the first execution engine has halted and that operation of the second execution has halted. The debugger program and/or the runtime driver may determine that the operations of the execution engines have halted by receiving a notification from one or both of the execution engines or by querying one or both of the execution engines.

At step 522, it is determined that the first execution engine has reached the first halt point. The debugger program and/or the runtime driver may determine that the first execution engine has reached the first halt point by receiving a notification from the first execution engine or by querying the first execution engine.

At step 524, the second execution engine is caused to move through instructions until reaching the second halt point. The debugger program and/or the runtime driver may cause the second execution engine to move through instructions. The second execution engine may move through instructions by automatically sequentially executing the instructions or by manually stepping through instructions. For example, the debugger program may cause (e.g., via user input) the second execution engine to manually step through (e.g., execute) each of the instructions until reaching the second halt point. The debugger program may then notify the user that the breakpoint has been reached.

Figure 6:
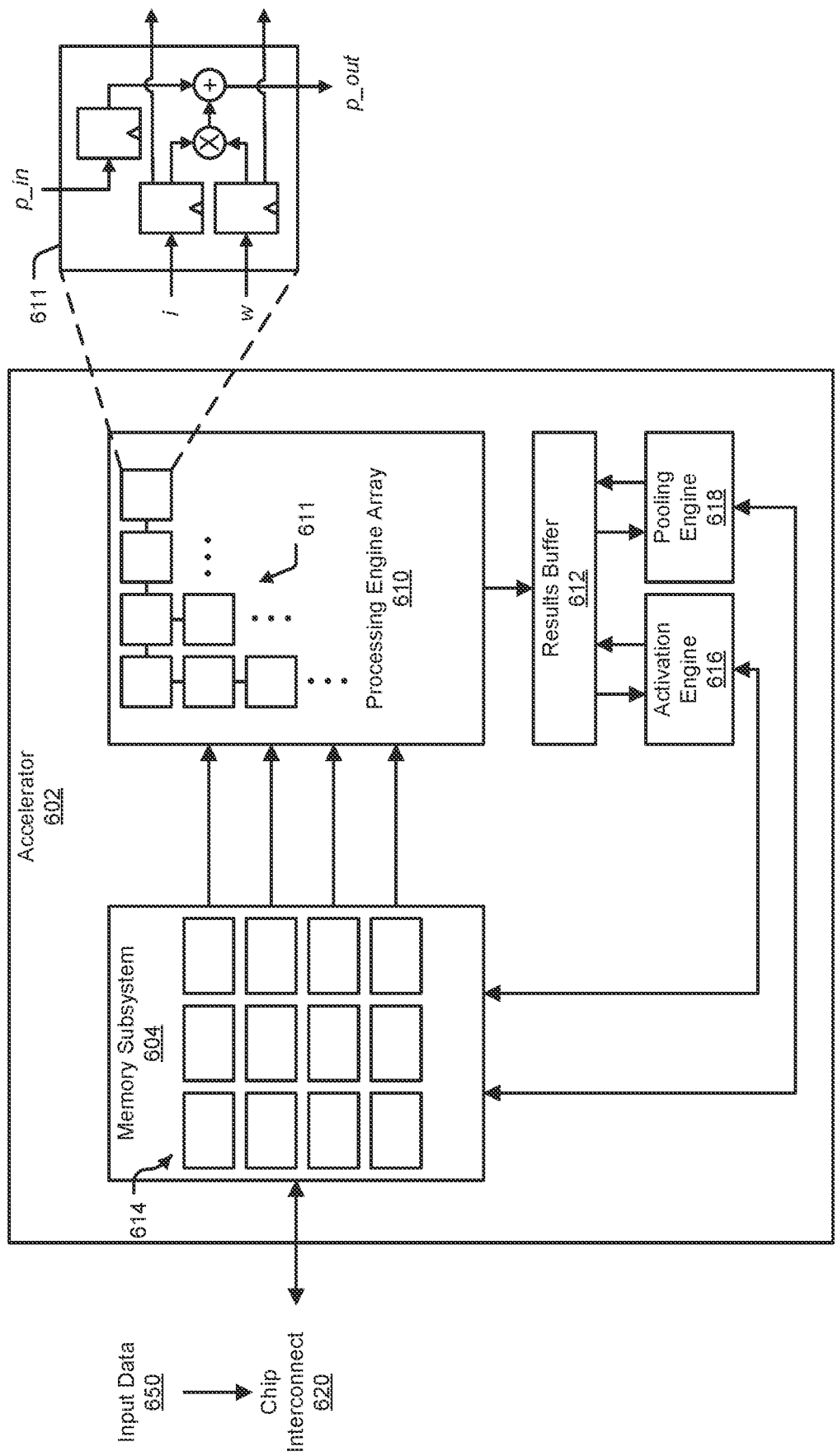
FIG. 6 includes a block diagram illustrating an example of an integrated circuit device.

FIG. 6 includes a block diagram illustrating an example of an integrated circuit device. The example of FIG. 6 illustrates an accelerator engine 602. In various examples, the accelerator engine 602, for a set of input data (e.g., input data 650), can execute computations using a processing engine array 610, an activation engine 616, and/or a pooling engine 618. In some examples, the example accelerator engine 602 may be an integrated circuit component of a processor, such as a neural network processor. The processor may have other integrated circuit components, including additional accelerator engines.

In various implementations, the memory subsystem 604 can include multiple memory banks 614. In these implementations, each memory bank 614 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 614. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 604 can permit simultaneous access to the read or write channels of multiple memory banks. As another example, the memory subsystem 604 can include arbitration logic such that arbitration between, for example, the outputs of multiple memory banks 614 can result in more than one memory bank's output being used. In these and other examples, though globally managed by the memory subsystem 604, each memory bank can be operated independently of any other.

Having the memory banks 614 be independently accessible can increase the efficiency of the accelerator 602. For example, values can be simultaneously read and provided to each row of the processing engine array 610, so that the entire processing engine array 610 can be in use in one clock cycle. As another example, the memory banks 614 can be read at the same time that results computed by the processing engine array 610 are written to the memory subsystem 604. In contrast, a single memory may be able to service only one read or write at a time. With a single memory, multiple clock cycles can be required, for example, to read input data for each row of the processing engine array 610 before the processing engine array 610 can be started. In various implementations, the memory subsystem 604 can be configured to simultaneously service multiple clients, including the processing engine array 610, the activation engine 616, the pooling engine 618, and any external clients that access the memory subsystem 604 over a communication fabric 620. In some implementations, being able to service multiple clients can mean that the memory subsystem 604 has at least as many memory banks as there are clients. In some cases, each row of the processing engine array 610 can count as a separate client. In some cases, each column of the processing engine array 610 can output a result, such that each column can count as a separate write client. In some cases, output from the processing engine array 610 can be written into the memory banks 614 that can then subsequently provide input data for the processing engine array 610. As another example, the activation engine 616 and the pooling engine 618 can include multiple execution channels, each of which can be separate memory clients. The memory banks 614 can be implemented, for example, using static random access memory (SRAM).

In various implementations, the memory subsystem 604 can include control logic. The control logic can, for example, keep track of the address spaces of each of the memory banks 614, identify memory banks 614 to read from or write to, and/or move data between the memory banks 614. In some implementations, memory banks 614 can be hardwired to particular clients. For example, a set of memory banks 614 can be hardwired to provide values to the rows of the processing engine array 610, with one memory bank servicing each row. As another example, a set of memory banks can be hired wired to receive values from columns of the processing engine array 610, with one memory bank receiving data for each column.

The processing engine array 610 is the computation matrix of the example accelerator 602. The processing engine array 610 can, for example, execute parallel integration, convolution, correlation, and/or matrix multiplication, among other things. The processing engine array 610 includes multiple processing engines 611, arranged in rows and columns, such that results output by one processing engine 611 can be input directly into another processing engine 611.

Processing engines 611 that are not on the outside edges of the processing engine array 610 thus can receive data to operate on from other processing engines 611, rather than from the memory subsystem 604.

In various examples, the processing engine array 610 uses systolic execution, in which data arrives at each processing engine 611 from different directions at regular intervals. In some examples, input data can flow into the processing engine array 610 from the left and weight values can be loaded at the top. In some examples weights and input data can flow from the left and partial sums can flow from top to bottom. In these and other examples, a multiply-and-accumulate operation moves through the processing engine array 610 as a diagonal wave front, with data moving to the right and down across the array. Control signals can be input at the left at the same time as weights, and can flow across and down along with the computation.

In various implementations, the number of columns in the processing engine array 610 determines the computational capacity of the processing engine array 610, and the number of rows determines the required memory bandwidth for achieving maximum utilization of the processing engine array 610. The processing engine array 610 can have, for example, 64 columns and 428 rows, or some other number of columns and rows.

An example of a processing engine 611 is illustrated in FIG. 6 in an inset diagram. As illustrated by this example, a processing engine 611 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 611.

In the illustrated example, an input from above can include a partial sum, p_in, provided either from another processing engine 611 or from a previous round of computation by the processing engine array 610. When starting a computation for a new set of input data, the top row of the processing engine array 610 can receive a fixed value for p_in, such as zero. As illustrated by this example, i and w are multiplied together and the result is summed with p_in to produce a new partial sum, p_out, which can be input into another processing engine 611. Various other implementations of the processing engine 611 are possible.

Outputs from the last row in the processing engine array 610 can be temporarily stored in the results buffer 612. The results can be intermediate results, which can be written to the memory banks 614 to be provided to the processing engine array 610 for additional computation. Alternatively, the results can be final results, which, once written to the memory banks 614 can be read from the memory subsystem 604 over the communication fabric 620, to be output by the system.

In some implementations, the accelerator 602 includes an activation engine 616. In these implementations, the activation engine 616 can combine the results from the processing engine array 610 into one or more output activations. For example, for a convolutional neural network, convolutions from multiple channels can be summed to produce an output activation for a single channel. In other examples, accumulating results from one or more columns in the processing engine array 610 may be needed to produce an output activation for a single node in the neural network. In some examples, activation engine 616 can be bypassed.

In various examples, the activation engine 616 can include multiple separate execution channels. In these examples, the execution channels can correspond to the columns of the processing engine array 610, and can perform an operation on the outputs of a column, the result of which can be stored in the memory subsystem 604. In these examples, the activation engine 616 may be able to perform between 1 and n parallel computations, where n is equal to the number of columns in the processing engine array 610. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 602 can include a pooling engine 618. Pooling is the combining of outputs of the columns of the processing engine array 610. Combining can include for example, computing a maximum value, a minimum value, an average value, a median value, a summation, a multiplication, or another logical or mathematical combination. In various examples, the pooling engine 618 can include multiple execution channels that can operating on values from corresponding columns of the processing engine array 610. In these examples, the pooling engine 618 may be able to perform between 1 and n parallel computations, where n is equal to the number of columns in the processing engine array 610. In various examples, execution channels of the pooling engine 618 can operate in parallel and/or simultaneously. In some examples, the pooling engine 618 can be bypassed.

Herein, the activation engine 616 and the pooling engine 618 may be referred to collectively as execution engines. The processing engine array 610 is another example of an execution engine. Another example of an execution engine is a Direct Memory Access (DMA) engine, which may be located outside the accelerator 602.

Input data 650 can arrive over the communication fabric 620. The communication fabric 620 can connect the accelerator 602 to other components of a processor, such as a DMA engine that can obtain input data 650 from an Input/Output (I/O) device, a storage drive, or a network interface. The input data 650 can be, for example one-dimensional data, such as a character string or numerical sequence, or two-dimensional data, such as an array of pixel values for an image or frequency and amplitude values over time for an audio signal. In some examples, the input data 650 can be three-dimensional, as may be the case with, for example, the situational information used by a self-driving car or virtual reality data. In some implementations, the memory subsystem 604 can include a separate buffer for the input data 650. In some implementations, the input data 650 can be stored in the memory banks 614 when the accelerator 602 receives the input data 650.

In some examples, the accelerator 602 can implement a neural network processing engine. In these examples, the accelerator 602, for a set of input data 650, can execute a neural network to perform a task for which the neural network was trained. Executing a neural network on a set of input data can be referred to as inference or performing inference.

The weights for the neural network can be stored in the memory subsystem 604, along with input data 650 on which the neural network will operate. The neural network can also include instructions, which can program the processing engine array 610 to perform various computations on the weights and the input data. The instructions can also be stored in the memory subsystem 604, in the memory banks 614 or in a separate instruction buffer. The processing engine array 610 can output intermediate results, which represent the outputs of individual layers of the neural network. In some cases, the activation engine 616 and/or pooling engine 618 may be enabled for computations called for by certain layers of the neural network. The accelerator 602 can store the intermediate results in the memory subsystem 604 for inputting into the processing engine array 610 to compute results for the next layer of the neural network. The processing engine array 610 can further output final results from a last layer of the neural network. The final results can be stored in the memory subsystem 604 and then be copied out to host processor memory or to another location.

Figure 7:
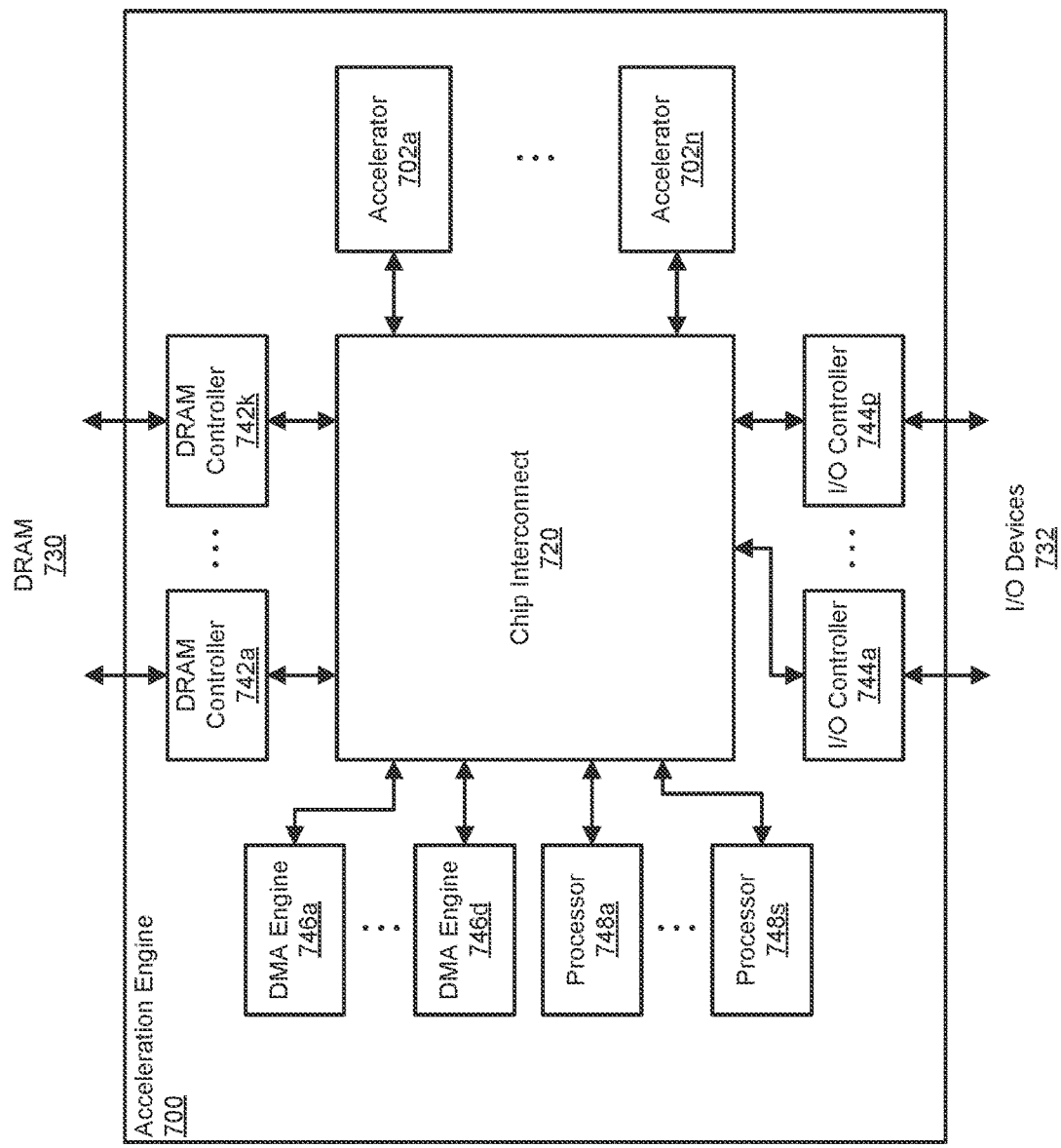
FIG. 7 includes a block diagram that illustrates an example of an acceleration engine.

FIG. 7 includes a block diagram that illustrates an example of an acceleration engine 700. The acceleration engine 700 is an example of an integrated circuit that can include one or more accelerators 702a-702n that may be similar to the accelerator illustrated in FIG. 6.

In the example of FIG. 7, the acceleration engine 700 includes multiple accelerators 702a-702n, each of which can perform a set of operations. In various examples, the accelerators 702a-702n for particular types of operations, so that the accelerators 702a-702n can perform the operations much faster than when similar operations are performed by a general purpose processor. In various examples, to perform a set of operations, input data on which the operations are to be performed must first be moved into the accelerators 702a-702n. Additionally, in some cases, program code is also moved into the accelerators 702a-702n, which programs the operations that the accelerators 702a-702n will perform on the data. In the illustrated example, the acceleration engine 700 includes n accelerators 702a-702n. Examples of accelerators that can be included in the acceleration engine 700 include graphics accelerators, floating point accelerators, neural network accelerators, and others. In various examples, the accelerators 702a-702n can each be the same (e.g., each of the is a graphics accelerator) or can be different (e.g., the accelerators 702a-702n include a graphics accelerator, a floating point accelerator, and neural network accelerator).

The example acceleration engine 700 further includes DRAM controllers 742a-742k for communicating with an external memory. The external memory is implemented, in this example, using DRAM 730. In the illustrated example, the acceleration engine 700 includes k DRAM controllers 742a-742k, each of which may be able to communicate with an independent set of banks of DRAM. In other examples, other types of RAM technology can be used for the external memory. The DRAM controllers 742a-742k can also be referred to as memory controllers.

In various examples, input data and/or program code for the accelerators 702a-702n can be stored in the DRAM 730. Different programs can cause the accelerators 702a-702n to perform different operations. For example, when one of the accelerators is a neural network accelerator, one program can configure the neural network accelerator to perform speech recognition while another program can configure the neural network accelerator to perform image recognition. In various examples, different accelerators 702a-702n can be programmed with different programs, so that each performs a different set of operations. In various examples, the processors 748a-748s can manage moving of program code from the DRAM 730 to the accelerators 702a-702n.

The example acceleration engine 700 further includes I/O controllers 744a-744p for communicating with I/O devices 732 in the system. The acceleration engine 700 can communicate with I/O devices over, for example, a processor bus. In some examples, the processor bus can be implemented using Peripheral Component Interconnect (PCI) and/or a variation of the PCI bus protocol. The processor bus can connect the acceleration engine 700 to I/O devices such as, for example, input and output devices, memory controllers, storage devices, and/or network interface cards, among other things. In some examples, the I/O controllers 744-744p can enable the acceleration engine 700 to act as an I/O device for a host processor. For example, the acceleration engine 700 can be the recipient of input data from the host processor, and a command indicating an operation to be performed on the input data (e.g., a particular computation or analysis). In the illustrated example, the acceleration engine 700 includes p I/O controllers 744a-744p, each of which may include a separate root complex and may communicate with a separate set of I/O devices 732. In other examples, other standardized bus protocols, such as Ultra Path Interconnect (UPI) can be used for the host bus. In other examples, a proprietary bus protocol can be used.

Movement of data in the acceleration engine 700 can be managed by one or more processors 748a-748s, which can also be referred to as data management processors. In the example of FIG. 7, the acceleration engine 700 includes s processors 748a-748s incorporated into (e.g., on the same silicon die) the device. In other examples, the processors 748a-748s can be external to the acceleration engine 700 (e.g., on a different die and/or in a different package). In some examples, the processors 748a-748s can manage the movement of data from I/O devices 732 to the accelerators 702a-702n or the DRAM 730. For example, input data may be located at an I/O device 732 or in processor memory, and the processors 748a-748s can move the input from the I/O device 732 or processor memory into an accelerator or into DRAM 730. As another example, program code for the accelerators 702a-702n may be located on an I/O device 732 or in processor memory.

The example acceleration engine 700 further includes DMA engines 746a-746d that can move data between the accelerators 702a-702n, DRAM controllers 742a-742k, and I/O controllers 744a-744p. In the illustrated example, the acceleration engine 700 includes d DMA engines 746a-746d. In some implementations, the DMA engines 746a-746d can be assigned to specific tasks, such as moving data from the DRAM controllers 742a-742d to the accelerators 702a-702n, or moving data between the I/O controllers 744a-744p and the accelerators 702a-702n. These tasks can be assigned, for example, by enqueueing descriptors with the DMA engines 746a-746d, where a descriptor identifies an address for a block of data and an operation (e.g., a read or a write) to perform. A descriptor, for example, can direct a DMA engine to instruct a DMA controller to read a block of data from DRAM 730. A descriptor can, as a further example, instruct the DMA engine to write data, read by the DMA controller, to an accelerator. Further descriptors can be used to move data from an accelerator to DRAM 730.

In various examples, each of the processors 748a-748s can be responsible for managing the data movement for a different accelerator. In some examples, a processor may manage the data movement for more than one accelerator. Similarly, in various examples, each of the processors 748a-748s can be assigned to one or more DMA engines 746a-746d. In these and other examples, associations between processors 748a-748s, accelerators 702a-702n, and DMA engines 746a-746d is determined by program code being executed by each respective processor.

In the example acceleration engine 700, the various components can communicate over a chip interconnect 720. The chip interconnect 720 primarily includes wiring for routing data between the components of the acceleration engine 700. In some cases, the chip interconnect 720 can include a minimal amount of logic, such as multiplexors to control the direction of data, flip-flops for handling clock domain crossings, and timing logic.

Figure 8:
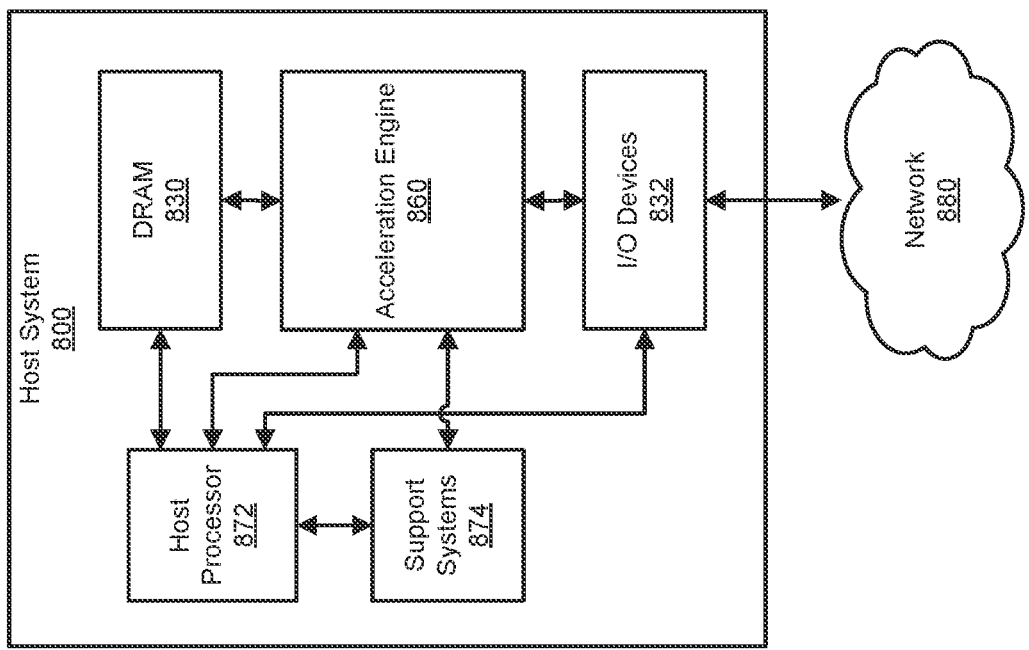
FIG. 8 includes a block diagram that illustrates an example of a host system in which an acceleration engine can be used.

FIG. 8 includes a block diagram that illustrates an example of a host system 800 in which an acceleration engine 860 can be used. The acceleration engine 860 of FIG. 8 is an example of a device that can include one or more accelerator engines such as is illustrated in FIG. 7. The example host system 800 of FIG. 8 includes the acceleration engine 860, a host processor 872, DRAM 830 or processor memory, I/O devices 832, and support systems 874. In various implementations, the host system 800 can include other hardware that is not illustrated here.

The host processor 872 is a general purpose integrated circuit that is capable of executing program instructions. In some examples, the host processor 872 can include multiple processing cores. A multi-core processor may include multiple processing units within the same processor In some examples, the host system 800 can include more than one host processor 872. In some examples, the host processor 872 and the acceleration engine 860 can be one chip, such as, one or more integrated circuits within the same package.

In various examples, the host processor 872 can communicate with other components in the host system 800 over one or more communication channels. For the example, the host system 800 can include a host processor bus, which the host processor 872 can use to communicate with the DRAM 830, for example. As another example, the host system 800 can include an I/O bus, such as a PCI-based bus, over which the host processor 872 can communicate with the acceleration engine 860 and/or the I/O devices 832, for example. In various examples, the host system 800 can, alternatively or additionally, include other communication channels or busses, such as serial busses, power management busses, storage device busses, and so on.

In some examples, software programs executing on the host processor 872 can receive or generate input for processing by the acceleration engine 860. In some examples, the programs can select an appropriate neural network to execute for a given input. For example, a program may be for language translation, and can select one or more neural networks capable of speech recognition and/or machine translation. In these and other examples, the programs can configure the acceleration engine 860 with the neural network to execute, and/or can select a neural network processing engine on the acceleration engine 860 that has previously been configured to execute the desired neural network. In some examples, once the acceleration engine 860 has started inference on input data, the host processor 872 can manage the movement of data (such as weights, instructions, intermediate results, results of conditional layers, and/or final results) into or out of the acceleration engine 860.

In some examples, a software program that is using the acceleration engine 860 to conduct inference can read the result from a conditional layer from the acceleration engine 860 and/or from a storage location, such as in DRAM 830. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinate by software.

The DRAM 830 is memory that is used by the host processor 872 for storage of program code that the host processor 872 is in the process of executing, as well as values that are being operated on. In some examples, the data for a neural network (e.g., weight values, instructions, and other data) can be all or partially stored in the DRAM 830. DRAM is a common term for processor memory, and though DRAM is volatile memory, processor memory can be volatile and/or non-volatile. Though not illustrated here, the host system 800 can include other volatile and non-volatile memories for other purposes. For example, the host system 800 can include a Read-Only Memory (ROM) that stores boot code for booting the host system 800 at power on, and/or Basic Input/Output System (BIOS) code.

Though not illustrated here, the DRAM 830 can store instructions for various programs, which can be loaded into and be executed by the host processor 872. For example, the DRAM 830 can be storing instructions for an operating system, one or more data stores, one or more application programs, one or more drivers, and/or services for implementing the features disclosed herein.

The operating system can manage and orchestrate the overall operation of the host system 800, such as scheduling tasks, executing applications, and/or controller peripheral devices, among other operations. In some examples, a host system 800 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 800. For example, some drivers can provide communication between the operating system and peripheral devices or I/O devices 832. Alternatively or additionally, some drivers may provide communication between application programs and the operating system, and/or application programs and peripheral devices accessible to the host system 800. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 832 can include hardware for connecting to user input and output devices, such as keyboards, mice, pens, tablets, voice input devices, touch input devices, displays or monitors, speakers, and printers, among other devices The I/O devices 832 can also include storage drives and/or network interfaces for connecting to a network 880. For example, the host system 800 can use a network interface to communicate with storage devices, user terminals, other computing devices or servers, and/or other networks, among various examples.

In various examples, one or more of the I/O devices 832 can be storage devices. In these examples, the storage device include non-volatile memory and can store program instructions and/or data. Examples of storage devices include magnetic storage, optical disks, solid state disks, flash memory, and/or tape storage, among others. The storage device can be housed in the same chassis as the host system 800 or may be in an external enclosure. A storage device can be fixed (e.g., attached by screws) or removable (e.g., having a physical release mechanism and possibly a hot-plug mechanism).

Storage devices, the DRAM 830, and any other memory component in the host system 800 are examples of computer-readable storage media. Computer-readable storage media are physical mediums that are capable of storing data in a format that can be read by a device such as the host processor 872. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. as used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 832 can be PCI-based devices. In these examples, a PCI-based I/O device includes a PCI interface for communicating with the host system 800. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 874 can include hardware for coordinating the operations of the acceleration engine 860. For example, the support systems 874 can include a microprocessor that coordinates the activities of the acceleration engine 860, including moving data around on the acceleration engine 860. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have much more limited capabilities than the host processor 872. In some examples, the program executed by the microprocessor is stored on the hardware of microprocessor, or on a non-volatile memory chip in the host system 800. In some examples, the microprocessor and the acceleration engine 860 can be on chip, such as one integrated circuit on the same die and in the same package.

In some examples, the support systems 874 can be responsible for taking instructions from the host processor 872 when programs executing on the host processor 872 request the execution of a neural network. For example, the host processor 872 can provide the support systems 874 with a set of input data and a task that is to be performed on the set of input data. In this example, the support systems 874 can identify a neural network that can perform the task, and can program the acceleration engine 860 to execute the neural network on the set of input data. In some examples, the support systems 874 only needs to select an appropriate neural network processing engine of the neural network processor. In some examples, the support systems 874 may need to load the data for the neural network onto the acceleration engine 860 before the acceleration engine 860 can start executing the neural network. In these and other examples, the support systems 874 can further receive the output of executing the neural network, and provide the output back to the host processor 872.

In some examples, the operations of the support systems 874 can be handled by the host processor 872. In these examples, the support systems 874 may not be needed and can be omitted from the host system 800.

In various examples, the host system 800 can include a combination of host systems, processor nodes, storage subsystems, and I/O chassis that represent user devices, service provider computers or third party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 800 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

Figure 9:
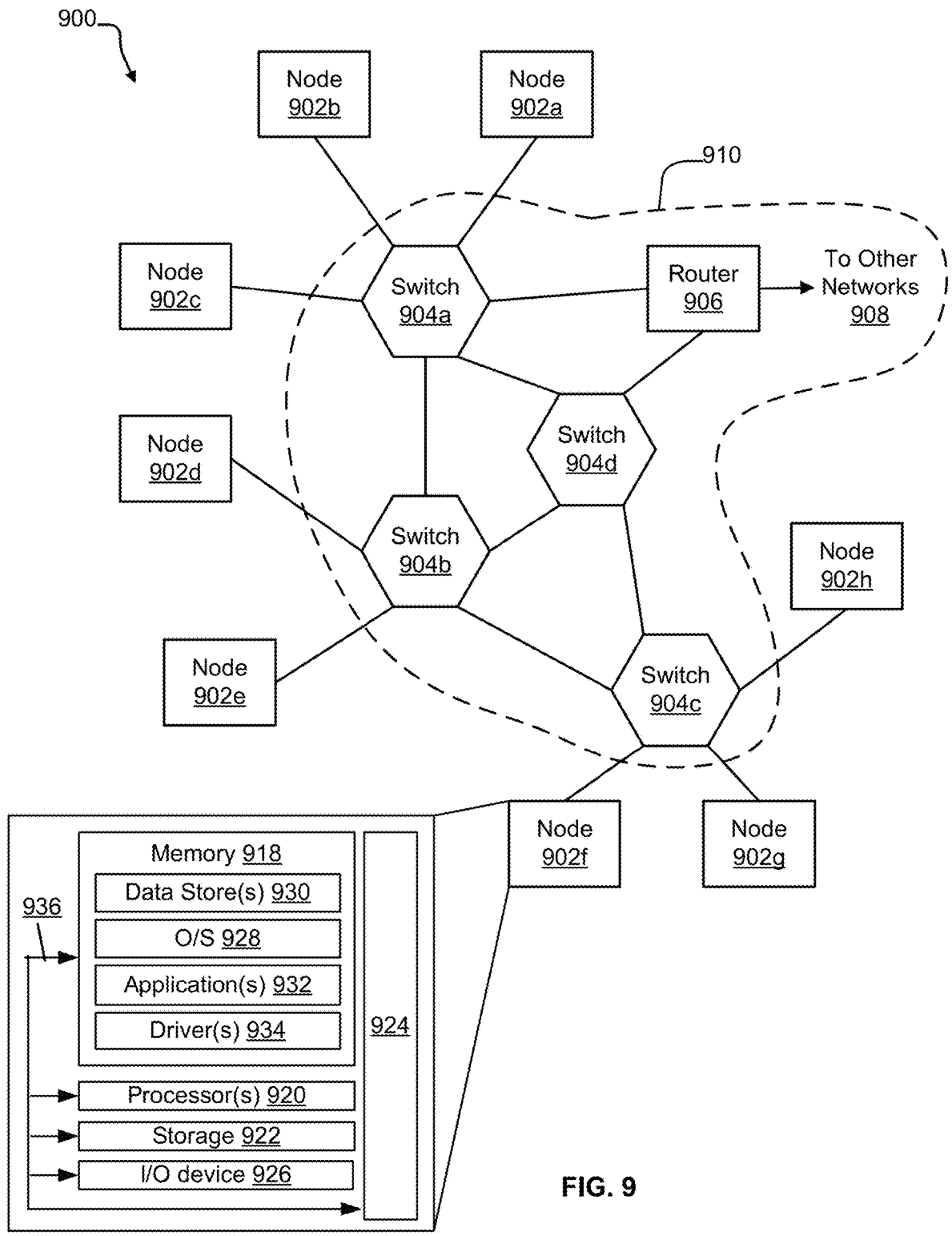
FIG. 9 includes a diagram of an example network, which can include one or more host systems.

FIG. 9 includes a diagram of an example network 900, which can include one or more host systems, such as the host system illustrated in FIG. 8. For example, the example network 900 of FIG. 9 includes multiple nodes 902a-902h, one or more of which can be a host system such as is illustrated in FIG. 8. Others of the nodes 902a-902h can be other computing devices, each of which include at least a memory for storing program instructions, a processor for executing the instructions, and a network interface for connecting to the network 900.

In various examples, the network 900 can be used to process data. For example, input data can be received at one of the nodes 902a-902h or from other networks 908 with which the network 900 can communicate. In this example, the input data can be directed to a node in the network 900 that includes an acceleration engine, for the acceleration engine to operate on and produce a result. The result can then be transferred to the node or other network from which the input data was received. In various examples, input data can be accumulated from various sources, including one or more of the nodes 902a-902h and/or computing devices located in the other networks 908, and the accumulated input data can be directed to one or more host systems in the network 900. Results from the host systems can then be distributed back to the sources from which the input data was gathered.

In various examples, one or more of the nodes 902a-902h can be responsible for operations such as accumulating input data for host systems to operate on, keeping track of which host systems are busy and which can accept more work, determining whether the host systems are operating correctly and/or most efficiently, monitoring network security, and/or other management operations.

In the example of FIG. 9, the nodes 902a-902h are connected to one another using a switched architecture with point-to point links. The switched architecture includes multiple switches 904a-904d, which can be arranged in a multi-layered network such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. The switches 904a-904d of FIG. 9 may be connected to the nodes 902a-902h and provide multiple paths between any two nodes.

The network 900 may also include one or more network devices for connection with other networks 908, such as a router 906. Routers use headers and forwarding tables to determine the best path for forwarding the packets, and use protocols such as internet control message protocol (ICMP) to communicate with each other and configure the best route between any two devices. The router 906 of FIG. 9 can be used to connect to other networks 908 such as subnets, LANs, wide area networks (WANs), and/or the Internet.

In some examples, network 900 may include any one or a combination of many different types of networks, such as cable networks, the Internet, wireless networks, cellular networks and other private and/or public networks. The interconnected switches 904a-904d and the router 906, if present, may be referred to as a switch fabric 910, a fabric, a network fabric, or simply a network. In the context of a computer network, terms "fabric" and "network" may be used interchangeably herein.

The nodes 902a-902h may be any combination of host systems, processor nodes, storage subsystems, and I/O chassis that represent user devices, service provider computers or third party computers.

User devices may include computing devices to access an application 932 (e.g., a web browser or mobile device application). In some aspects, the application 932 may be hosted, managed, and/or provided by a computing resources service or service provider. The application 932 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 908. Additionally, the user device(s) may be part of the distributed system managed by, controlled by, or otherwise part of the service provider computer(s) (e.g., a console device integrated with the service provider computers).

The node(s) of FIG. 9 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some examples, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 932 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 902a-902h may include at least one memory 918 and one or more processing units (or processor(s) 920). The processor(s) 920 may be implemented in hardware, computer-executable instructions, firmware, or combinations thereof. Computer-executable instruction or firmware implementations of the processor(s) 920 may include computer-executable or machine-executable instructions written in any suitable programming language to perform the various functions described.

In some instances, the hardware processor(s) 920 may be a single core processor or a multi-core processor. A multi-core processor may include multiple processing units within the same processor. In some examples, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 918 may store program instructions that are loadable and executable on the processor(s) 920, as well as data generated during the execution of these programs. Depending on the configuration and type of the node(s) 902a-902h, the memory 918 may be volatile (such as RAM) and/or non-volatile (such as ROM, flash memory, etc.). The memory 918 may include an operating system 928, one or more data stores 930, one or more application programs 932, one or more drivers 934, and/or services for implementing the features disclosed herein.

The operating system 928 may support nodes 902a-902h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, IOS, Android, and the like. The operating system 928 may also be a proprietary operating system.

The data stores 930 may include permanent or transitory data used and/or operated on by the operating system 928, application programs 932, or drivers 934. Examples of such data include web pages, video data, audio data, images, user data, and so on. The information in the data stores 930 may, in some implementations, be provided over the network(s) 908 to user devices. In some cases, the data stores 930 may additionally or alternatively include stored application programs and/or drivers. Alternatively or additionally, the data stores 930 may store standard and/or proprietary software libraries, and/or standard and/or proprietary application user interface (API) libraries. Information stored in the data stores 930 may be machine-readable object code, source code, interpreted code, or intermediate code.

The drivers 934 include programs that may provide communication between components in a node. For example, some drivers 934 may provide communication between the operating system 928 and additional storage 922, network device 924, and/or I/O device 926. Alternatively or additionally, some drivers 934 may provide communication between application programs 932 and the operating system 928, and/or application programs 932 and peripheral devices accessible to the service provider computer. In many cases, the drivers 934 may include drivers that provide well-understood functionality (e.g., printer drivers, display drivers, hard disk drivers, Solid State Device drivers). In other cases, the drivers 934 may provide proprietary or specialized functionality.

The service provider computer(s) or servers may also include additional storage 922, which may include removable storage and/or non-removable storage. The additional storage 922 may include magnetic storage, optical disks, solid state disks, flash memory, and/or tape storage. The additional storage 922 may be housed in the same chassis as the node(s) 902a-902h or may be in an external enclosure. The memory 918 and/or additional storage 922 and their associated computer-readable media may provide non-volatile storage of computer-readable instructions, data structures, program modules, and other data for the computing devices. In some implementations, the memory 918 may include multiple different types of memory, such as SRAM, DRAM, or ROM.

The memory 918 and the additional storage 922, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 918 and the additional storage 922 are examples of computer storage media. Additional types of computer storage media that may be present in the node(s) 902a-902h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 902a-902h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 902a-902h may also include I/O device(s) 926, such as a keyboard, a mouse, a pen, a voice input device, a touch input device, a display, speakers, a printer, and the like. The node(s) 902a-902h may also include one or more communication channels 936. A communication channel 936 may provide a medium over which the various components of the node(s) 902a-902h can communicate. The communication channel or channels 936 may take the form of a bus, a ring, a switching fabric, or a network.

The node(s) 902a-902h may also contain network device (s) 924 that allow the node(s) 902a-902h to communicate with a stored database, another computing device or server, user terminals and/or other devices on the network(s) 900.

In some implementations, the network device 924 is a peripheral device, such as a PCI-based device. In these implementations, the network device 924 includes a PCI interface for communicating with a host device. The term "PCI" or "PCI-based" may be used to describe any protocol in the PCI family of bus protocols, including the original PCI standard, PCI-X, AGP, and PCIe or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using NVMe. NVMe is a device interface specification for accessing non-volatile storage media attached to a computing system using PCIe. For example, the bus interface module may implement NVMe, and the network device 924 may be connected to a computing system using a PCIe interface.

A PCI-based device may include one or more functions. A "function" describes operations that may be provided by the network device 924. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 924 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A non-transitory computer-readable medium comprising instructions that, when executed by a processor, cause the processor to perform operations comprising:
   receiving a set of instructions for executing a neural network, the neural network comprising a plurality of layers including a target layer, the set of instructions having been previously compiled by a compiler, wherein the set of instructions are to be executed by an execution engine of an integrated circuit device, and wherein an offset indicates a starting instruction in the set of instructions corresponding to a start of the target layer in the set of instructions;
   inserting, by a runtime driver, an additional instruction into the set of instructions based on runtime conditions after receiving the set of instructions;
   tracking, by the runtime driver, information regarding the additional instruction; and
   providing, by the runtime driver, the information regarding the additional instruction to a debugger program, wherein the debugger program is configured to:
      determine an adjusted offset based on the offset and the information regarding the additional instruction;
      set a halt point within the set of instructions based on the adjusted offset; and
      determine that operation of the execution engine has halted.

2. The non-transitory computer-readable medium of claim 1, wherein the set of instructions is a first set of instructions, and the execution engine is a first execution engine, wherein the set of instructions further comprises a second set of instructions to be executed by a second execution engine of the integrated circuit device.

3. The non-transitory computer-readable medium of claim 2, wherein the offset is a first offset, the halt point is a first halt point, and the adjusted offset is a first adjusted offset, wherein a second offset indicates a starting instruction in the second set of instructions corresponding to the start of the target layer in the second set of instructions, and wherein the debugger program is further configured to:
   determine a second adjusted offset based on the second offset and the information regarding the additional instruction; and
   set a second halt point within the second set of instructions based on the second adjusted offset.

4. The non-transitory computer-readable medium of claim 3, wherein the debugger program is further configured to:
   determine that the first execution engine has reached the first halt point and that the second execution engine has not reached the second halt point, wherein the first execution engine reaching the first halt point causes both the first execution engine and the second execution engine to halt; and
   cause the second execution engine to move through instructions until reaching the second halt point.

5. The non-transitory computer-readable medium of claim 1, wherein the instruction is inserted into the set of instructions in preparation of transferring the set of instructions to an instruction buffer of the execution engine.

6. The non-transitory computer-readable medium of claim 1, wherein the neural network includes a plurality of layers including the target layer, and wherein the target layer includes a plurality of nodes.

7. The non-transitory computer-readable medium of claim 1, wherein the offset is determined by the compiler and is provided to the debugger program by the compiler.

8. A method comprising:
   receiving a set of instructions for executing a neural network, the neural network comprising a plurality of layers including a target layer, the set of instructions having been previously compiled by a compiler, wherein the set of instructions are to be executed by an execution engine of an integrated circuit device, and wherein an offset indicates a starting instruction in the set of instructions corresponding to a start of the target layer in the set of instructions;
   inserting, by a runtime driver, an additional instruction into the set of instructions based on runtime conditions after receiving the set of instructions;
   tracking, by the runtime driver, information regarding the additional instruction; and
   providing, by the runtime driver, the information regarding the additional instruction inserted by the runtime driver to a debugger program, wherein the debugger program is configured to:
      determine an adjusted offset based on the offset and the information regarding the additional instruction;
      set a halt point within the set of instructions based on the adjusted offset; and
      determine that operation of the execution engine has halted.

9. The method of claim 8, wherein the set of instructions is a first set of instructions, and the execution engine is a first execution engine, wherein the set of instructions further comprises a second set of instructions to be executed by a second execution engine of the integrated circuit device.

10. The method of claim 9, wherein the offset is a first offset, the halt point is a first halt point, and the adjusted offset is a first adjusted offset, wherein a second offset indicates a starting instruction in the second set of instructions corresponding to the start of the target layer in the second set of instructions, and wherein the debugger program is further configured to:
  determine a second adjusted offset based on the second offset and the information regarding the additional instruction; and
  set a second halt point within the second set of instructions based on the second adjusted offset.

11. The method of claim 10, wherein the debugger program is further configured to:
  determine that the first execution engine has reached the first halt point and that the second execution engine has not reached the second halt point, wherein the first execution engine reaching the first halt point causes both the first execution engine and the second execution engine to halt; and
  cause the second execution engine to move through instructions until reaching the second halt point.

12. The method of claim 8, wherein the instruction is inserted into the set of instructions in preparation of transferring the set of instructions to an instruction buffer of the execution engine.

13. The method of claim 8, wherein the neural network includes a plurality of layers including the target layer, and wherein the target layer includes a plurality of nodes.

14. The method of claim 8, wherein the offset is determined by the compiler and is provided to the debugger program by the compiler.

15. A system comprising:
  a processor; and
  a non-transitory computer-readable medium comprising instructions that, when executed by the processor, cause the processor to perform operations comprising:
    receiving a set of instructions for executing a neural network, the neural network comprising a plurality of layers including a target layer, the set of instructions having been previously compiled by a compiler, wherein the set of instructions are to be executed by an execution engine of an integrated circuit device, and wherein an offset indicates a starting instruction in the set of instructions corresponding to a start of the target layer in the set of instructions;
    inserting, by a runtime driver, an additional instruction into the set of instructions based on runtime conditions after receiving the set of instructions;
    tracking, by the runtime driver, information regarding the additional instruction; and
    providing, by the runtime driver, the information regarding the additional instruction to a debugger program, wherein the debugger program is configured to:
      determine an adjusted offset based on the offset and the information regarding the additional instruction;
      set a halt point within the set of instructions based on the adjusted offset; and
      determine that operation of the execution engine has halted.

16. The system of claim 15, wherein the set of instructions is a first set of instructions, and the execution engine is a first execution engine, wherein the set of instructions further comprises a second set of instructions to be executed by a second execution engine of the integrated circuit device.

17. The system of claim 16, wherein the offset is a first offset, the halt point is a first halt point, and the adjusted offset is a first adjusted offset, wherein a second offset indicates a starting instruction in the second set of instructions corresponding to the start of the target layer in the second set of instructions, and wherein the debugger program is further configured to:
  determine a second adjusted offset based on the second offset and the information regarding the additional instruction; and
  set a second halt point within the second set of instructions based on the second adjusted offset.

18. The system of claim 17, wherein the debugger program is further configured to:
  determine that the first execution engine has reached the first halt point and that the second execution engine has not reached the second halt point, wherein the first execution engine reaching the first halt point causes both the first execution engine and the second execution engine to halt; and
  cause the second execution engine to move through instructions until reaching the second halt point.

19. The system of claim 15, wherein the instruction is inserted into the set of instructions in preparation of transferring the set of instructions to an instruction buffer of the execution engine.

20. The system of claim 15, wherein the neural network includes a plurality of layers including the target layer, and wherein the target layer includes a plurality of nodes.

* * * * *